US012190803B2

(12) United States Patent

Shang et al.

(10) Patent No.: US 12,190,803 B2

(45) Date of Patent: Jan. 7, 2025

(54) ARRAY SUBSTRATE AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Tinghua Shang, Beijing (CN); Biao Liu, Beijing (CN); Siyu Wang, Beijing (CN); Yuge Chu, Beijing (CN); Yi Zhang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/789,180

(22) PCT Filed: Sep. 17, 2021

(86) PCT No.: PCT/CN2021/119097

§ 371 (c)(1),
(2) Date: Jun. 25, 2022

(87) PCT Pub. No.: WO2023/039842

PCT Pub. Date: Mar. 23, 2023

(65) Prior Publication Data

US 2024/0177661 A1 May 30, 2024

(51) Int. Cl.
*G09G 3/3233* (2016.01)

(52) U.S. Cl.
CPC ... *G09G 3/3233* (2013.01); *G09G 2300/0426* (2013.01); *G09G 2310/061* (2013.01)

(58) Field of Classification Search
CPC . H01L 27/14603; H01L 23/52; H01L 27/124; H01L 27/14601; H10K 59/131;
(Continued)

(56) References Cited

U.S. PATENT DOCUMENTS

| | | | |
|---|---|---|---|
| 2004/0080648 | A1 | 4/2004 | Rhodes |
| 2009/0073294 | A1 | 3/2009 | Morimoto |

(Continued)

FOREIGN PATENT DOCUMENTS

| | | | |
|---|---|---|---|
| CN | 103137068 | A | 6/2013 |
| CN | 105679250 | A | 6/2016 |

(Continued)

OTHER PUBLICATIONS

International Search Report & Written Opinion mailed May 19, 2022, regarding PCT/CN2021/119097.

(Continued)

*Primary Examiner* — Temesghen Ghebretinsae
*Assistant Examiner* — Ivelisse Martinez Quiles
(74) *Attorney, Agent, or Firm* — Intellectual Valley Law, P.C.

(57) ABSTRACT

An array substrate is provided. The array substrate includes K number of reset signal lines respectively configured to provide reset signals to reset transistors in K columns pixel driving circuits of the array substrate. The K number of reset signal lines includes a plurality of third reset signal lines in (2k−1)-th columns of K columns, K and k being positive integers, 1≤k≤(K/2), and a plurality of fourth reset signal lines in (2k)-th columns of the K columns. A respective third reset signal line and a respective fourth reset signal line have different line patterns.

17 Claims, 30 Drawing Sheets

(58) Field of Classification Search
CPC ........... H10K 59/12; G09G 2300/0426; G09G 3/3233; G09G 2310/061; G09G 3/3258; G09G 3/3225; G09G 3/3266; G09G 2300/0814; G09G 2300/0819; G09G 2300/0866; G09G 2320/045; H04N 25/766
See application file for complete search history.

(56) References Cited

U.S. PATENT DOCUMENTS

| | | | |
|---|---|---|---|
| 2012/0013590 A1 | 1/2012 | Minami et al. | |
| 2013/0140538 A1 | 6/2013 | Fujita et al. | |
| 2017/0200417 A1 | 7/2017 | Wu et al. | |
| 2018/0053795 A1 | 2/2018 | Lan | |
| 2018/0218683 A1 | 8/2018 | Huangfu et al. | |
| 2019/0326381 A1 | 10/2019 | Hou | |
| 2021/0151540 A1 | 5/2021 | Wang | |
| 2021/0193778 A1 | 6/2021 | Wang et al. | |
| 2021/0265530 A1* | 8/2021 | Ikeda | H01L 33/06 |
| 2022/0328592 A1* | 10/2022 | You | H10K 71/00 |

FOREIGN PATENT DOCUMENTS

| | | |
|---|---|---|
| CN | 106782313 A | 5/2017 |
| CN | 106886111 A | 6/2017 |
| CN | 108335667 A | 7/2018 |
| CN | 110114885 A | 8/2019 |
| CN | 211265478 U | 8/2020 |
| CN | 112956036 A | 6/2021 |

OTHER PUBLICATIONS

Q. Zeng et al., "Integrated Circuit Layout Design Tutorial", Shanghai Science and Technology Press, 2012, pp. 247-251, 261-264; English translation attached.

* cited by examiner

BEST AVAILABLE IMAGE

ARRAY SUBSTRATE AND DISPLAY APPARATUS

CROSS-REFERENCE TO RELATED APPLICATION

This application is a national stage application under 35 U.S.C. § 371 of International Application No. PCT/CN2021/119097, filed Sep. 17, 2021, the contents of which are incorporated by reference in the entirety.

TECHNICAL FIELD

The present invention relates to display technology, more particularly, to an array substrate and a display apparatus.

BACKGROUND

Organic Light Emitting Diode (OLED) display is one of the hotspots in the field of flat panel display research today. Unlike Thin Film Transistor-Liquid Crystal Display (TFT-LCD), which uses a stable voltage to control brightness, OLED is driven by a driving current required to be kept constant to control illumination. The OLED display panel includes a plurality of pixel units configured with pixel-driving circuits arranged in multiple rows and columns. Each pixel-driving circuit includes a driving transistor having a gate terminal connected to one gate line per row and a drain terminal connected to one data line per column. When the row in which the pixel unit is gated is turned on, the switching transistor connected to the driving transistor is turned on, and the data voltage is applied from the data line to the driving transistor via the switching transistor, so that the driving transistor outputs a current corresponding to the data voltage to an OLED device. The OLED device is driven to emit light of a corresponding brightness.

SUMMARY

In one aspect, the present disclosure provides an array substrate, comprising K number of reset signal lines respectively configured to provide reset signals to reset transistors in K columns pixel driving circuits of the array substrate; wherein the K number of reset signal lines comprises a plurality of third reset signal lines in (2k−1)-th columns of K columns, K and k being positive integers, 1≤k≤(K/2); and a plurality of fourth reset signal lines in (2k)-th columns of the K columns; wherein a respective third reset signal line and a respective fourth reset signal line have different line patterns.

Optionally, the array substrate comprises a first interconnected reset signal supply network and a second interconnected reset signal supply network; wherein the first interconnected reset signal supply network comprises the plurality of third reset signal lines in the (2k−1)-th columns, and a plurality of first reset signal lines respectively cross over the plurality of third reset signal lines; and the second interconnected reset signal supply network comprises the plurality of fourth reset signal lines in the (2k)-th columns, and a plurality of second reset signal lines respectively cross over the plurality of fourth reset signal lines.

Optionally, a respective first reset signal line is connected to one or more of the plurality of third reset signal lines; a respective third reset signal line is connected to one or more of the plurality of first reset signal lines; a respective second reset signal line is connected to one or more of the plurality of fourth reset signal lines; and a respective fourth reset signal line is connected to one or more of the plurality of second reset signal lines.

Optionally, the plurality of first reset signal lines and the plurality of second reset signal lines extend along a first direction, respectively; the plurality of third reset signal lines and the plurality of fourth reset signal lines extend along a second direction, respectively; and the plurality of first reset signal lines and the plurality of second reset signal lines are alternately arranged along the second direction.

Optionally, the plurality of third reset signal lines are substantially parallel to each other; the plurality of fourth reset signal lines are substantially parallel to each other; and a respective third reset signal line is non-parallel to a respective fourth reset signal line.

Optionally, a segment of a respective third reset signal line between two adjacent first reset signal lines and a segment of a respective fourth reset signal line between the two adjacent first reset signal lines are non-parallel to each other; or a segment of a respective third reset signal line between two adjacent second reset signal lines and a segment of a respective fourth reset signal line between the two adjacent second reset signal lines are non-parallel to each other.

Optionally, a respective third reset signal line comprises a first colinear segment, a second colinear segment, and a first non-colinear segment connecting the first colinear segment to the second colinear segment; and a respective fourth reset signal line comprises a third colinear segment, a fourth colinear segment, and a second non-colinear segment connecting the third colinear segment to the fourth colinear segment.

Optionally, a first distance between connecting points of the first non-colinear segment with the first colinear segment and the second colinear segment is different from a second distance between connecting points of the second non-colinear segment with the third colinear segment and the fourth colinear segment.

Optionally, the first non-colinear segment deviates from a virtual line connecting the first colinear segment and the second colinear segment by a first maximum distance; the second non-colinear segment deviates from a virtual line connecting the third colinear segment and the fourth colinear segment by a second maximum distance; and the first maximum distance is different from the second maximum distance.

Optionally, the first non-colinear segment deviates from the virtual line connecting the first colinear segment and the second colinear segment, and the second non-colinear segment deviates from the virtual line connecting the third colinear segment and the fourth colinear segment, toward a same side of the array substrate.

Optionally, the array substrate further comprises a first initialization connecting line present in a (2k)-th column, and absent in a (2k−1)-th column and a second initialization connecting line present in the (2k−1)-th column, and absent in the (2k)-th column.

Optionally, the first initialization connecting line in a (2k)-th column connects a respective first reset signal line of the plurality of first reset signal lines and a source electrode of a first reset transistor in a respective pixel driving circuit in the (2k)-th column together; the second initialization connecting line in the (2k−1)-th column connects a respective second reset signal line of the plurality of second reset signal lines and a source electrode of a second reset transistor in the respective pixel driving circuit in the (2k−1)-th column together; a respective third reset signal line in a (2k−1)-th column connects a respective first reset signal line of the plurality of first reset signal lines and a source electrode of a first reset transistor in a respective pixel driving circuit in the (2k−1)-th column together; and a respective fourth reset signal line in the (2k)-th column connects a respective second reset signal line of the plurality of second reset signal lines and a source electrode of a second reset transistor in the respective pixel driving circuit in the (2k)-th column together.

Optionally, at least in one respective column of pixel driving circuit, a total number of pixel driving circuits is P; in the respective column, a ratio of a total number of reset signal lines extending along a second direction and through P number of pixel driving circuits to a total number of initialization connecting lines is 1:P.

Optionally, the array substrate comprises a semiconductor material layer; wherein, in a respective subpixel, the semiconductor material layer comprises an active layer of a third transistor, an active layer of a fifth transistor, an active layer of a driving transistor, and a third node portion that is connected to the active layer of the third transistor, the active layer of the fifth transistor, and the active layer of the driving transistor in the respective subpixel; and at least 50% of an orthographic projection of the third node portion on a base substrate is non-overlapping with an orthographic projection of a respective third reset signal line or a respective fourth reset signal line on the base substrate.

Optionally, the third node portion comprises a first part connecting the active layer of the third transistor to the active layer of the fifth transistor, the first part extending along a second direction; and a second part connecting the first part to the active layer of the driving transistor, the second part extending along the first direction.

Optionally, in a (2k−1)-th column, a first non-colinear segment of the respective third reset signal line crosses over the second part of the third node portion in a (2k−1)-th column; or an orthographic projection of the first non-colinear segment on a base substrate partially overlaps with an orthographic projection of the active layer of the driving transistor on the base substrate.

Optionally, in a (2k)-th column, a second non-colinear segment of the respective fourth reset signal line crosses over the first part of the third node portion in a (2k)-th column; and an orthographic projection of the second non-colinear segment on a base substrate is non-overlapping with an orthographic projection of a channel part of the active layer of the driving transistor on the base substrate.

Optionally, the array substrate further comprises a plurality of gate lines; wherein, in a respective pixel driving circuit, a respective gate line comprises a main portion extending along an extension direction of the respective gate line, and a gate protrusion protruding away from the main portion; and at least 70% of the orthographic projection of the gate protrusion on a base substrate is non-overlapping with an orthographic projection of a reset signal on the base substrate.

Optionally, the array substrate further comprises a plurality of second voltage supply lines on a side of the plurality of third reset signal lines away from a base substrate; and a plurality of anodes on a side of the plurality of second voltage supply lines away from the base substrate; wherein an orthographic projection of at least one anode on the base substrate overlaps with an orthographic projection of a respective second voltage supply line on the base substrate and an orthographic projection of a respective third reset signal line on the base substrate.

In another aspect, the present disclosure provides a display apparatus, comprising the array substrate described herein or fabricated by a method described herein, and an integrated circuit connected to the array substrate.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, an array substrate and a display apparatus that substantially obviate one or more of the problems due to limitations and disadvantages of the related art. In one aspect, the present disclosure provides an array substrate. In some embodiments, the array substrate includes K number of reset signal lines respectively configured to provide reset signals to reset transistors in K columns pixel driving circuits of the array substrate. Optionally, the K number of reset signal lines includes a plurality of third reset signal lines in (2k−1)-th columns of K columns, K and k being positive integers, $1 \leq k \leq (K/2)$; and a plurality of fourth reset signal lines in (2k)-th columns of the K columns. Optionally, a respective third reset signal line and a respective fourth reset signal line have different line patterns.

Various appropriate pixel driving circuits may be used in the present array substrate. Examples of appropriate driving circuits include 3T1C, 2T1C, 4T1C, 4T2C, 5T2C, 6T1C, 7T1C, 7T2C, 8T1C, and 8T2C. In some embodiments, the respective one of the plurality of pixel driving circuits is an 7T1C driving circuit. Various appropriate light emitting elements may be used in the present array substrate. Examples of appropriate light emitting elements include organic light emitting diodes, quantum dots light emitting diodes, and micro light emitting diodes. Optionally, the light emitting element is micro light emitting diode. Optionally, the light emitting element is an organic light emitting diode including an organic light emitting layer.

Figure 1:
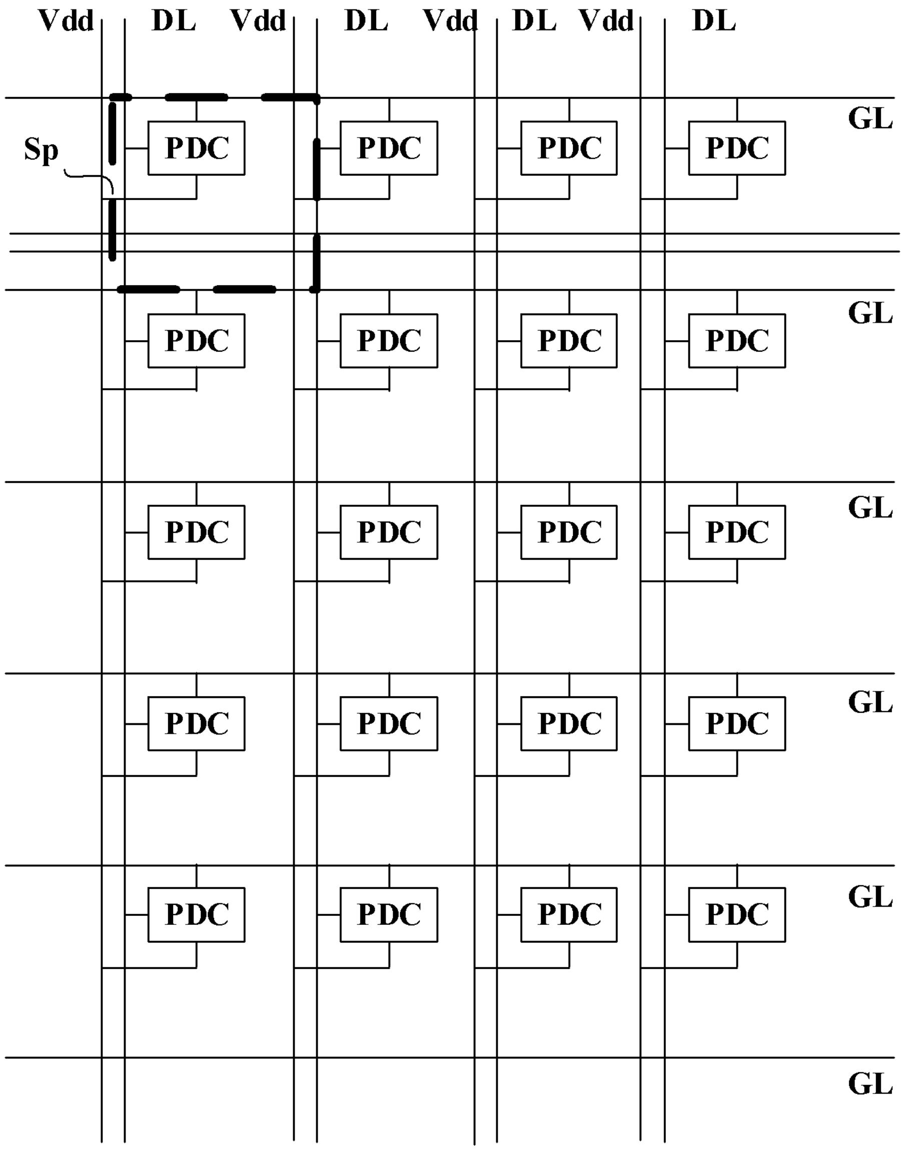
FIG. 1 is a plan view of an array substrate in some embodiments according to the present disclosure.

FIG. 1 is a plan view of an array substrate in some embodiments according to the present disclosure. Referring to FIG. 1, the array substrate includes an array of subpixels Sp. Each subpixel includes an electronic component, e.g., a light emitting element. In one example, the light emitting element is driven by a respective pixel driving circuit PDC. The array substrate includes a plurality of gate lines GL, a plurality of data lines DL, and a plurality of high voltage signal lines Vdd. Light emission in a respective subpixel is driven by a respective pixel driving circuit PDC. In one example, a high voltage signal is input, through a respective one of the plurality of high voltage signal lines Vdd, to the respective pixel driving circuit PDC connected to an anode of the light emitting element; a low voltage signal is input to a cathode of the light emitting element. A voltage difference between the high voltage signal (e.g., the VDD signal) and the low voltage signal (e.g., the VSS signal) is a driving voltage ΔV that drives light emission in the light emitting element.

The array substrate in some embodiments includes a plurality of subpixels. In some embodiments, the plurality of subpixels includes a respective first subpixel, a respective second subpixel, a respective third subpixel, and a respective fourth subpixel. Optionally, a respective pixel of the array substrate includes the respective first subpixel, the respective second subpixel, the respective third subpixel, and the respective fourth subpixel. The plurality of subpixels in the array substrate are arranged in an array. In one example, the array of the plurality of subpixels includes a S1-S2-S3-S4 format repeating array, in which S1 stands for the respective first subpixel, S2 stands for the respective second subpixel, S3 stands for the respective third subpixel, and S4 stands for the respective fourth subpixel. In another example, the S1-S2-S3-S4 format is a C1-C2-C3-C4 format, in which C1 stands for the respective first subpixel of a first color, C2 stands for the respective second subpixel of a second color, C3 stands for the respective third subpixel of a third color, and C4 stands for the respective fourth subpixel of a fourth color. In another example, the S1-S2-S3-S4 format is a C1-C2-C3-C2' format, in which C1 stands for the respective first subpixel of a first color, C2 stands for the respective second subpixel of a second color, C3 stands for the respective third subpixel of a third color, and C2' stands for the respective fourth subpixel of the second color. In another example, the C1-C2-C3-C2' format is a R-G-B-G format, in which the respective first subpixel is a red subpixel, the respective second subpixel is a green subpixel, the respective third subpixel is a blue subpixel, and the respective fourth subpixel is a green subpixel.

In some embodiments, a minimum repeating unit of the plurality of subpixels of the array substrate includes the respective first subpixel, the respective second subpixel, the respective third subpixel, and the respective fourth subpixel. Optionally, each of the respective first subpixel, the respective second subpixel, the respective third subpixel, and the respective fourth subpixel, includes the first transistor T1, the second transistor T2, the third transistor T3, the fourth transistor T4, the fifth transistor T5, the sixth transistor T6, and the driving transistor Td.

Various appropriate pixel driving circuits may be used in the present array substrate. Examples of appropriate driving circuits include 3T1C, 2T1C, 4T1C, 4T2C, 5T2C, 6T1C, 7T1C, 7T2C, 8T1C, and 8T2C. In some embodiments, the respective one of the plurality of pixel driving circuits is an 7T1C driving circuit. Various appropriate light emitting elements may be used in the present array substrate. Examples of appropriate light emitting elements include organic light emitting diodes, quantum dots light emitting diodes, and micro light emitting diodes. Optionally, the light emitting element is micro light emitting diode. Optionally, the light emitting element is an organic light emitting diode including an organic light emitting layer.

Figure 2A:
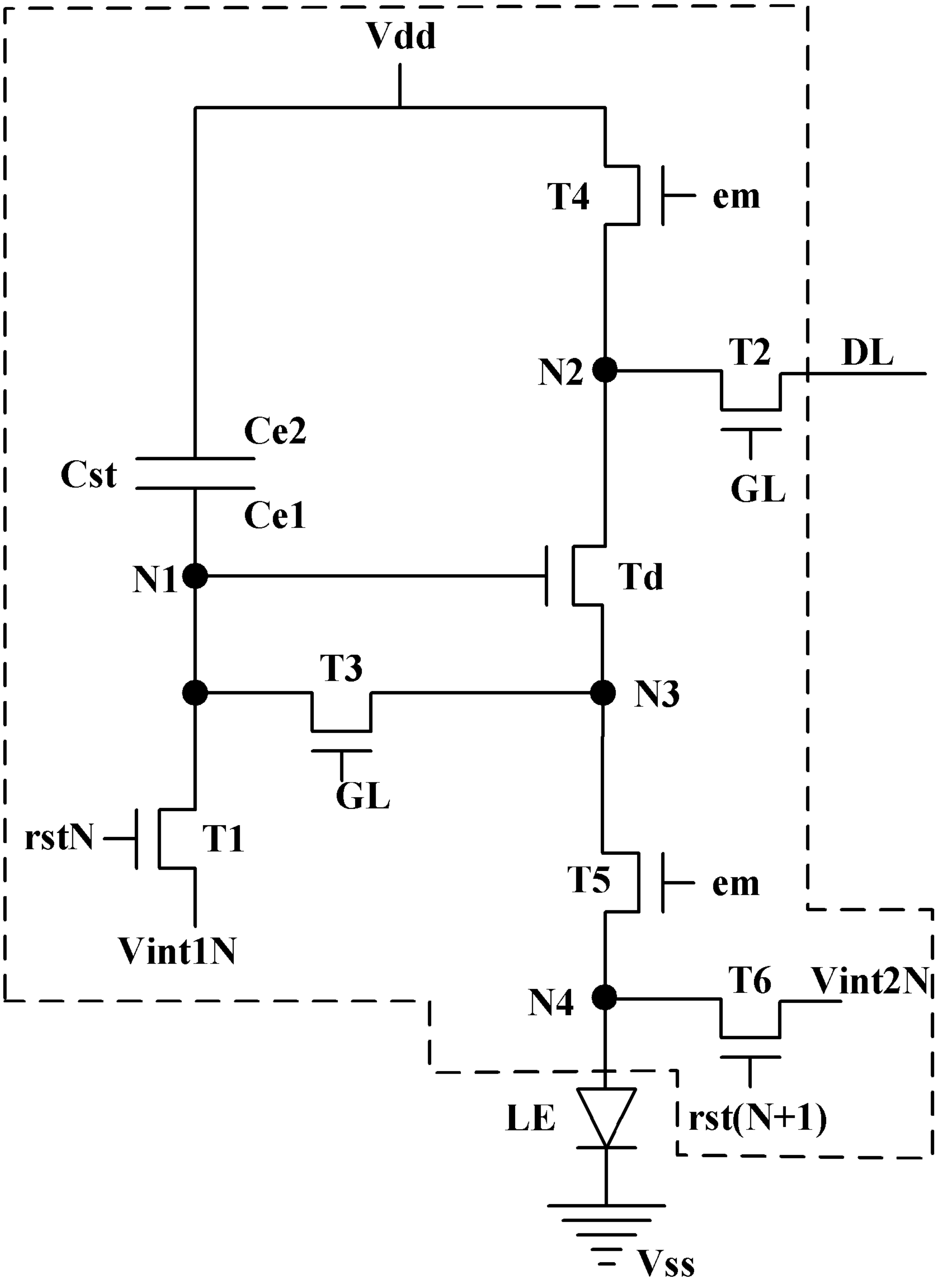
FIG. 2A is a circuit diagram illustrating the structure of a pixel driving circuit in some embodiments according to the present disclosure.

FIG. 2A is a circuit diagram illustrating the structure of a pixel driving circuit in some embodiments according to the present disclosure. Referring to FIG. 2A, in some embodiments, the respective pixel driving circuit includes a driving transistor Td; a storage capacitor Cst having a first capacitor electrode Ce1 and a second capacitor electrode Ce2; a first transistor T1 having a gate electrode connected to a respective reset control signal line rstN in a present stage of a plurality of reset control signal lines, a source electrode connected to a respective first reset signal line VintN1 in a present stage of a plurality of first reset signal lines, and a drain electrode connected to a first capacitor electrode Ce1 of the storage capacitor Cst and a gate electrode of the driving transistor Td; a second transistor T2 having a gate electrode connected to a respective gate line of a plurality of gate lines GL, a source electrode connected to a respective data line of a plurality of data lines DL, and a drain electrode connected to a source electrode of the driving transistor Td; a third transistor T3 having a gate electrode connected to the respective gate line, a source electrode connected to the first capacitor electrode Ce1 of the storage capacitor Cst and the gate electrode of the driving transistor Td, and a drain electrode connected to a drain electrode of the driving transistor Td; a fourth transistor T4 having a gate electrode connected to a respective light emitting control signal line of a plurality of light emitting control signal lines em, a source electrode connected to a respective voltage supply line of a plurality of voltage supply lines Vdd, and a drain electrode connected to the source electrode of the driving transistor Td and the drain electrode of the second transistor T2; a fifth transistor T5 having a gate electrode connected to the respective light emitting control signal line, a source electrode connected to drain electrodes of the driving transistor Td and the third transistor T3, and a drain electrode connected to an anode of a light emitting element LE; and a sixth transistor T6 having a gate electrode connected to a respective reset control signal line rst(N+1) in a next adjacent stage of a plurality of reset control signal lines, a source electrode connected to a respective second reset signal line Vint2N in the present stage of the plurality of second reset signal lines, and a drain electrode connected to the drain electrode of the fifth transistor and the anode of the light emitting element LE. The second capacitor electrode Ce2 is connected to the respective voltage supply line and the source electrode of the fourth transistor T4.

Figure 2B:
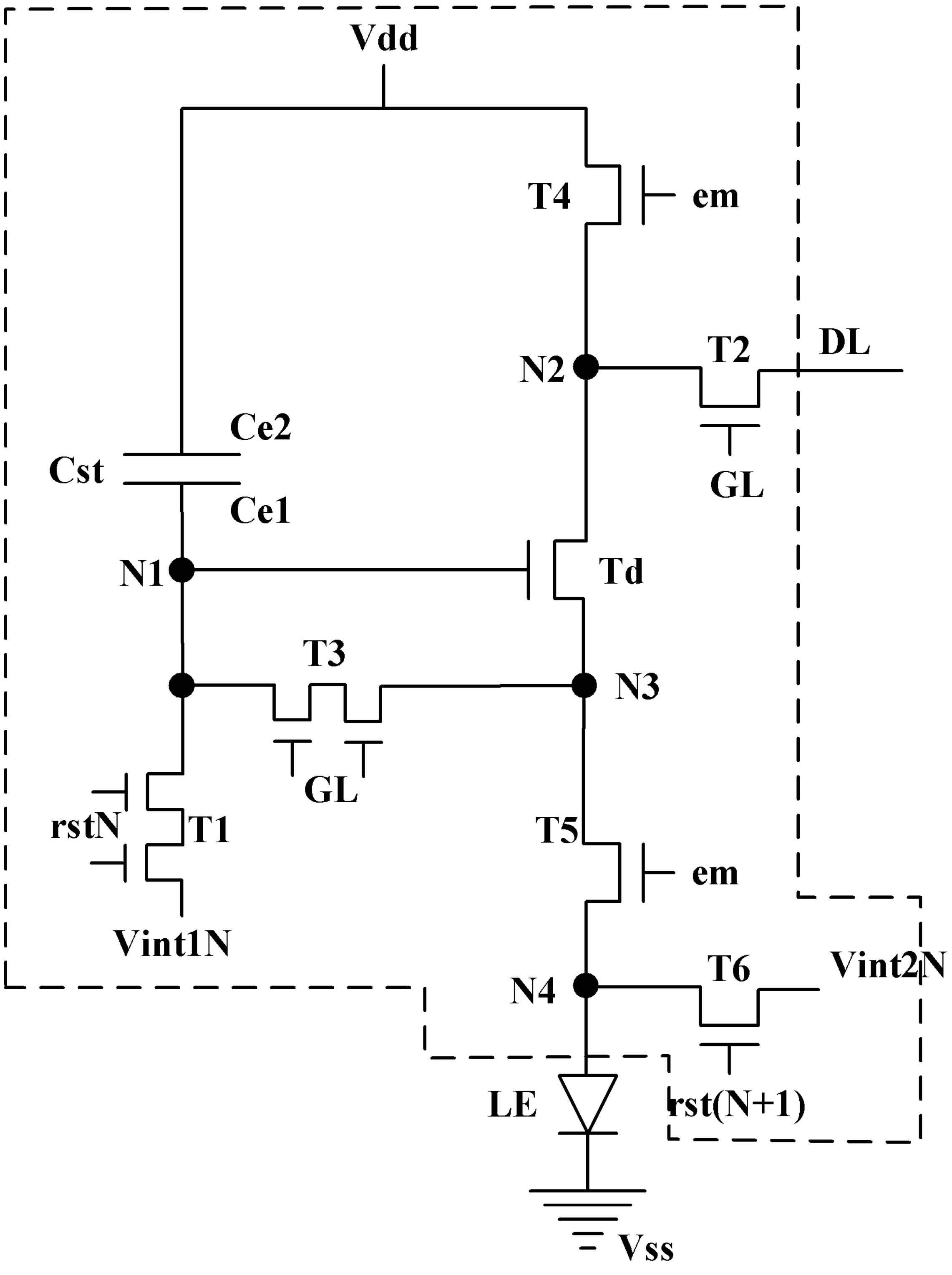
FIG. 2B is a circuit diagram illustrating the structure of a pixel driving circuit in some embodiments according to the present disclosure.

FIG. 2B is a circuit diagram illustrating the structure of a pixel driving circuit in some embodiments according to the present disclosure. Referring to FIG. 2B, in some embodiments, the third transistor T3 is a “double gate” transistor, and the first transistor T1 is a “double gate” transistor. Optionally, in a “double gate” first transistor, the active layer of the first transistor crosses over a respective reset control signal lines twice (alternatively, the respective reset control signal line crosses over the active layer of the first transistor T1 twice). Similarly, in a “double gate” third transistor, the active layer of the third transistor T3 crosses over a respective gate line of the plurality of gate lines GL twice (alternatively, the respective gate line crosses over the active layer of the third transistor T3 twice).

The pixel driving circuit further include a first node N1, a second node N2, a third node N3, and a fourth node N4. The first node N1 is connected to the gate electrode of the driving transistor Td, the first capacitor electrode Ce1, and the source electrode of the third transistor T3. The second node N2 is connected to the drain electrode of the fourth transistor T4, the drain electrode of the second transistor T2, and the source electrode of the driving transistor Td. The third node N3 is connected to the drain electrode of the driving transistor Td, the drain electrode of the third transistor T3, and the source electrode of the fifth transistor T5. The fourth node N4 is connected to the drain electrode of the fifth transistor T5, the drain electrode of the sixth transistor T6, and the anode of the light emitting element LE.

In embodiments according to the present disclosure, a source electrode or a drain electrode refers to one of a first terminal and a second terminal of a transistor, the first terminal and the second terminal being connected to an active layer of the transistor. A direction of a current flowing through the transistor may be configured to be from a source electrode to a drain electrode, or from a drain electrode to a source electrode. Accordingly, depending on the direction of the current flowing through the transistor, in one example, the source electrode is configured to receive an input signal and the drain electrode is configured to output an output signal; in another example, the drain electrode is configured to receive an input signal and the source electrode is configured to output an output signal. For example, referring to FIG. 5C, a first terminal of the first transistor T1 (denoted as S1) may be a source electrode or a drain electrode depending on a direction of the current or a type of the transistor; similarly, a second terminal of the first transistor T1 (denoted as D1) may be a drain electrode or a source electrode. As another example, a first terminal of the six transistor T6 (denoted as S6) may be a source electrode or a drain electrode depending on a direction of the current or a type of the transistor; similarly, a second terminal of the six transistor T6 (denoted as D6) may be a drain electrode or a source electrode. Accordingly, the source electrode or the drain electrode of other transistor are interchangeable with each other depending on a direction of the current or a type of the transistor, and the description thereof is omitted here.

Figure 3A:
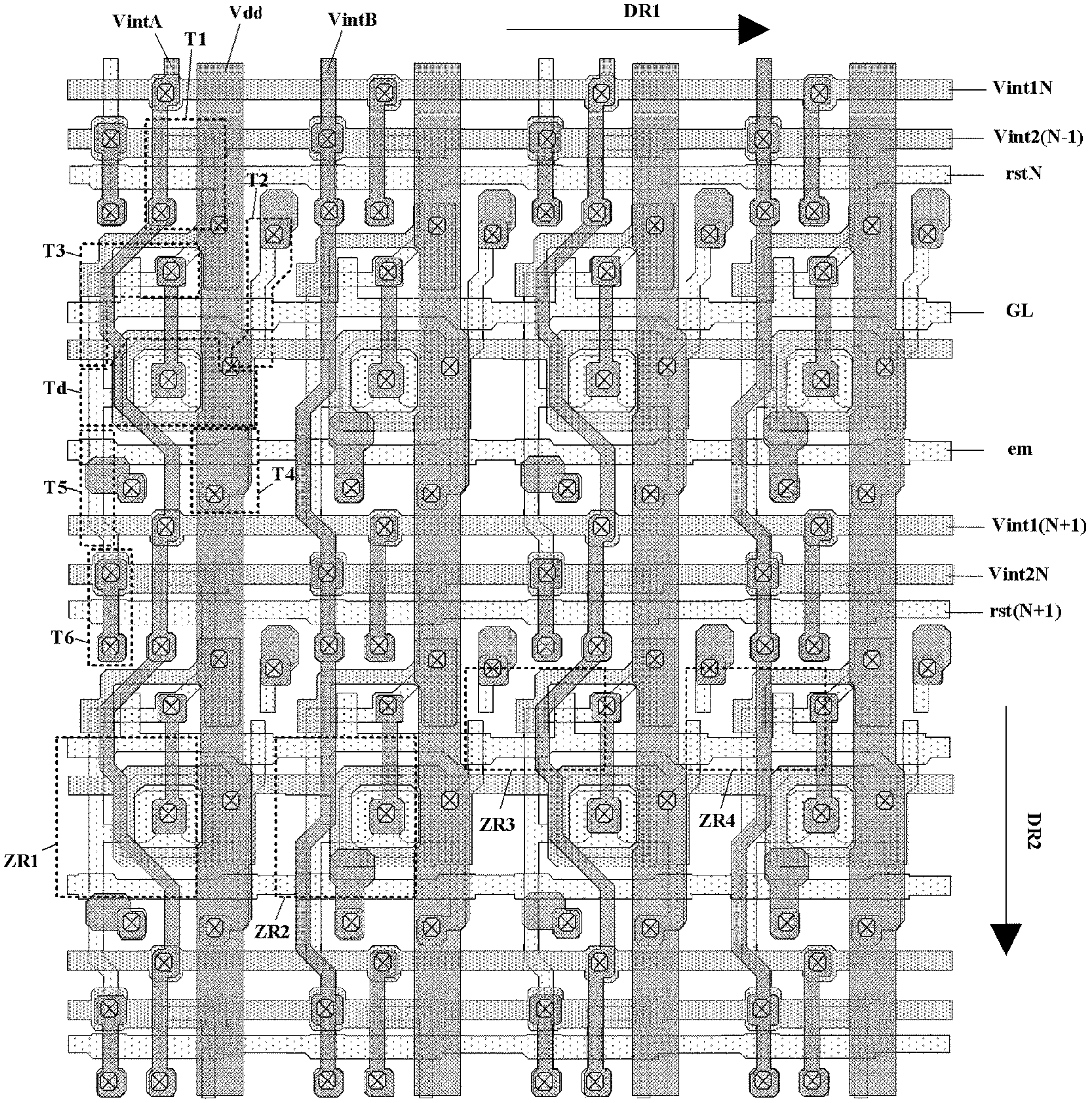
FIG. 3A is a diagram illustrating the structure of an array substrate in some embodiments according to the present disclosure.

FIG. 3A is a diagram illustrating the structure of an array substrate in some embodiments according to the present disclosure. FIG. 3A illustrates the structures of several layers of the array substrate, including a semiconductor material layer, a first conductive layer, a second conductive layer, and a first signal line layer. Corresponding positions of the plurality of transistors in a pixel driving circuit are depicted in FIG. 3A. The pixel driving circuit includes the first transistor T1, the second transistor T2, the third transistor T3, the fourth transistor T4, the fifth transistor T5, the sixth transistor T6, and the driving transistor Td. Referring to FIG. 3A, the array substrate in some embodiments includes a plurality of subpixels (e.g., a red subpixel, a green subpixel, and a blue subpixel). The array substrate in some embodiments includes a plurality of gate lines GL respectively extending along a first direction DR1, a plurality of reset control signal lines (including a reset control signal line of a present stage rstN and a reset control signal line of a next adjacent stage rst(N+1)) respectively extending along the first direction DR1; a plurality of first reset signal lines (including a respective first reset signal line of a present stage Vint1N, and a respective first reset signal line of a next adjacent stage Vint1(N+1)) respectively extending along the first direction DR1, a plurality of second reset signal lines (including a respective second reset signal line of a present stage Vinit2N, and a respective second reset signal line of a previous adjacent stage Vinit2(N−1)) respectively extending along the first direction DR1; and a plurality of light emitting control signal lines em respectively extending along the first direction DR1. Optionally, the plurality of gate lines GL, the plurality of light emitting control signal lines em, and the plurality of reset control signal lines are in a first conductive layer. Optionally, the plurality of first reset signal lines and the plurality of second reset signal lines are in the second conductive layer.

Referring to FIG. 3A, the array substrate in some embodiments further includes a plurality of voltage supply lines Vdd respectively extending along the second direction DR2, a plurality of third reset signal lines (including a respective third reset signal line VintA), for example, in (2k−1)-th columns of K columns, K and k being positive integers, 1≤k≤(K/2) respectively extending along the second direction DR2, and a plurality of fourth reset signal lines (including a respective fourth reset signal line VintB), for example, in (2k)-th columns of the K columns) respectively extending along the second direction DR2. Optionally, the plurality of voltage supply lines Vdd, the plurality of third reset signal lines, and the plurality of fourth reset signal lines are in a first signal line layer.

As used herein, the term "(2k−1)-th column" and the term "(2k)-th column" are used in the context of the K columns. The array substrate may or may not include additional column(s) before the first column of the K columns and/or additional columns after the last column of the K columns. In the context of the array substrate, the term "(2k−1)-th column" does not necessarily denote an odd-numbered column, and the term "(2k)-th column does not necessarily denote an even-numbered column. In one example, the (2k−1)-th column is an odd-numbered column in the context of the K columns, but may be an even-numbered column in the context of the array substrate. In another example, the (2k−1)-th column is an odd-numbered column in the context of the K columns, and also an odd-numbered column in the context of the array substrate. In one example, the (2k)-th column is an even-numbered column in the context of the K columns, but may be an odd-numbered column in the context of the array substrate. In another example, the (2k)-th column is an even-numbered column in the context of the K columns, and also an even-numbered column in the context of the array substrate.

Figure 3B:
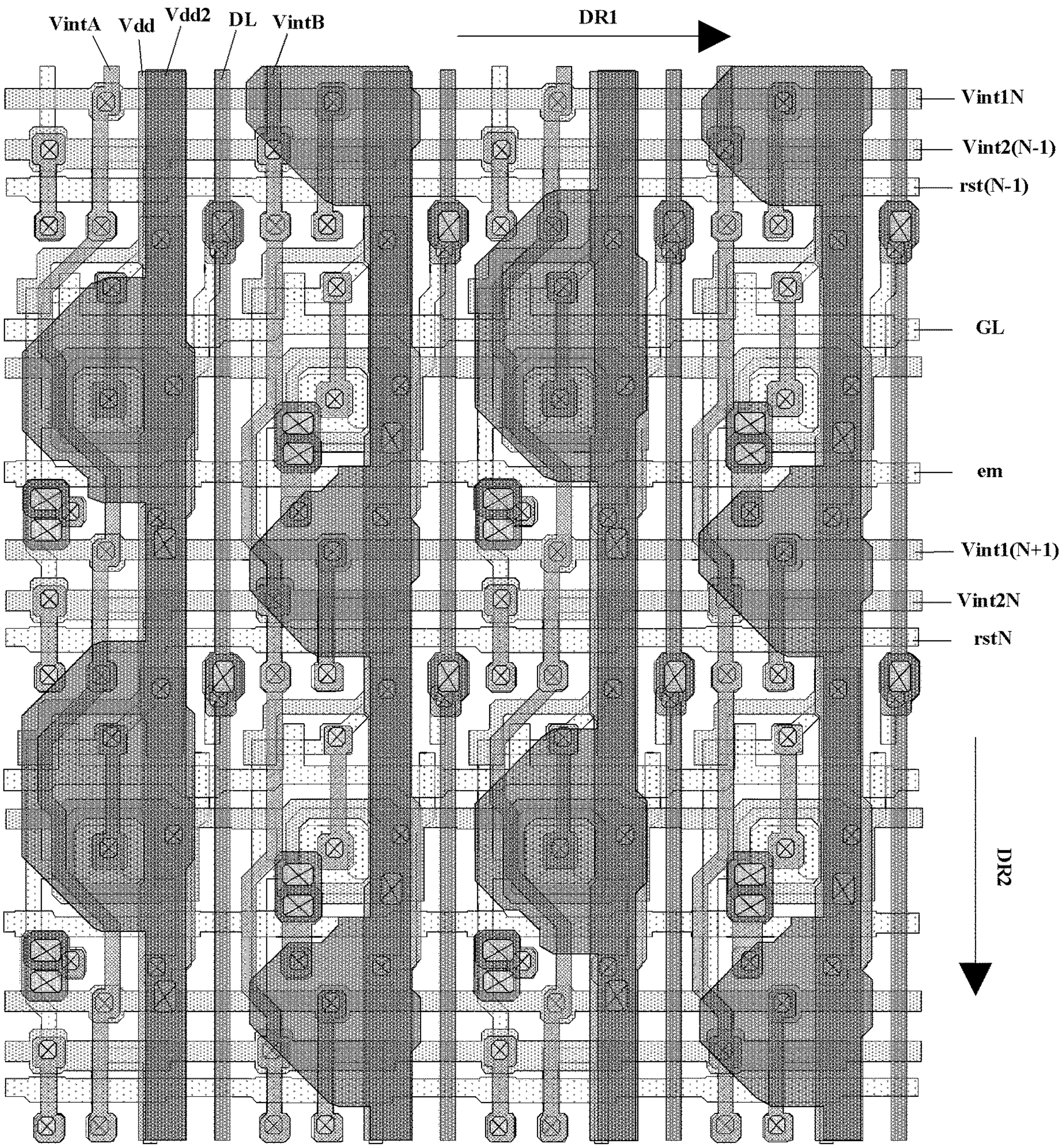
FIG. 3B is a diagram illustrating the structure of an array substrate in some embodiments according to the present disclosure.

FIG. 3B is a diagram illustrating the structure of an array substrate in some embodiments according to the present disclosure. FIG. 3B illustrates the structures of several layers of the array substrate, including a semiconductor material layer, a first conductive layer, a second conductive layer, a first signal line layer, and a second signal line layer. Referring to FIG. 3B, the array substrate in some embodiments further includes a plurality of data lines DL respectively extending along the second direction DR2 and a plurality of second voltage supply lines Vdd2 respectively extending along the second direction DR2. Optionally, the plurality of data lines DL and the plurality of second voltage supply lines Vdd2 are in the second signal line layer. Optionally, a respective voltage supply line is connected to a respective second voltage supply line. Optionally, an orthographic projection of the respective voltage supply line on a base substrate at least partially overlaps with an orthographic projection of the respective second voltage supply line on the base substrate.

Figure 4A:
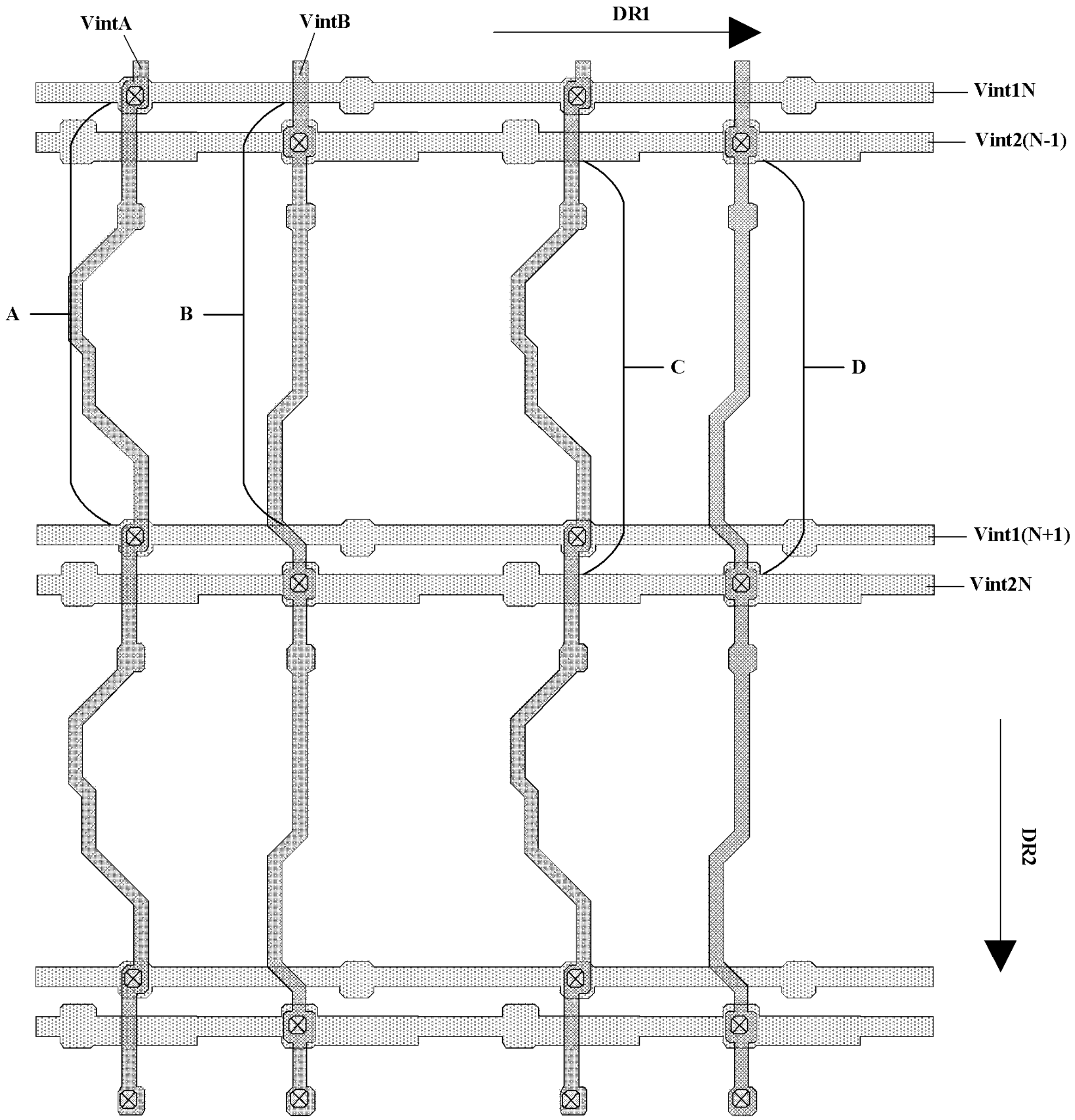
FIG. 4A is a diagram illustrating the structure of a reset signal supply network in an array substrate in some embodiments according to the present disclosure.

FIG. 4A is a diagram illustrating the structure of a reset signal supply network in an array substrate in some embodiments according to the present disclosure. Referring to FIG. 4A, the reset signal supply network in some embodiments includes a first interconnected reset signal supply network and a second interconnected reset signal supply network. In some embodiments, the first interconnected reset signal supply network includes a plurality of first reset signal lines respectively extending along the first direction DR1 and a plurality of third reset signal lines respectively extending along the second direction DR2. A respective first reset signal line is connected to one or more (e.g., multiple ones, or optionally all) of the plurality of third reset signal lines. A respective third reset signal line is connected to one or more (e.g., multiple ones, or optionally all) of the plurality of first reset signal lines. The plurality of first reset signal lines respectively cross over the plurality of third reset signal lines. In some embodiments, the second interconnected reset signal supply network includes a plurality of second reset signal lines respectively extending along the first direction DR1 and a plurality of fourth reset signal lines respectively extending along the second direction DR2. A respective second reset signal line is connected to one or more (e.g., multiple ones, or optionally all) of the plurality of fourth reset signal lines. A respective fourth reset signal line is connected to one or more (e.g., multiple ones, or optionally all) of the plurality of second reset signal lines. The plurality of second reset signal lines respectively cross over the plurality of fourth reset signal lines.

Figure 4B:
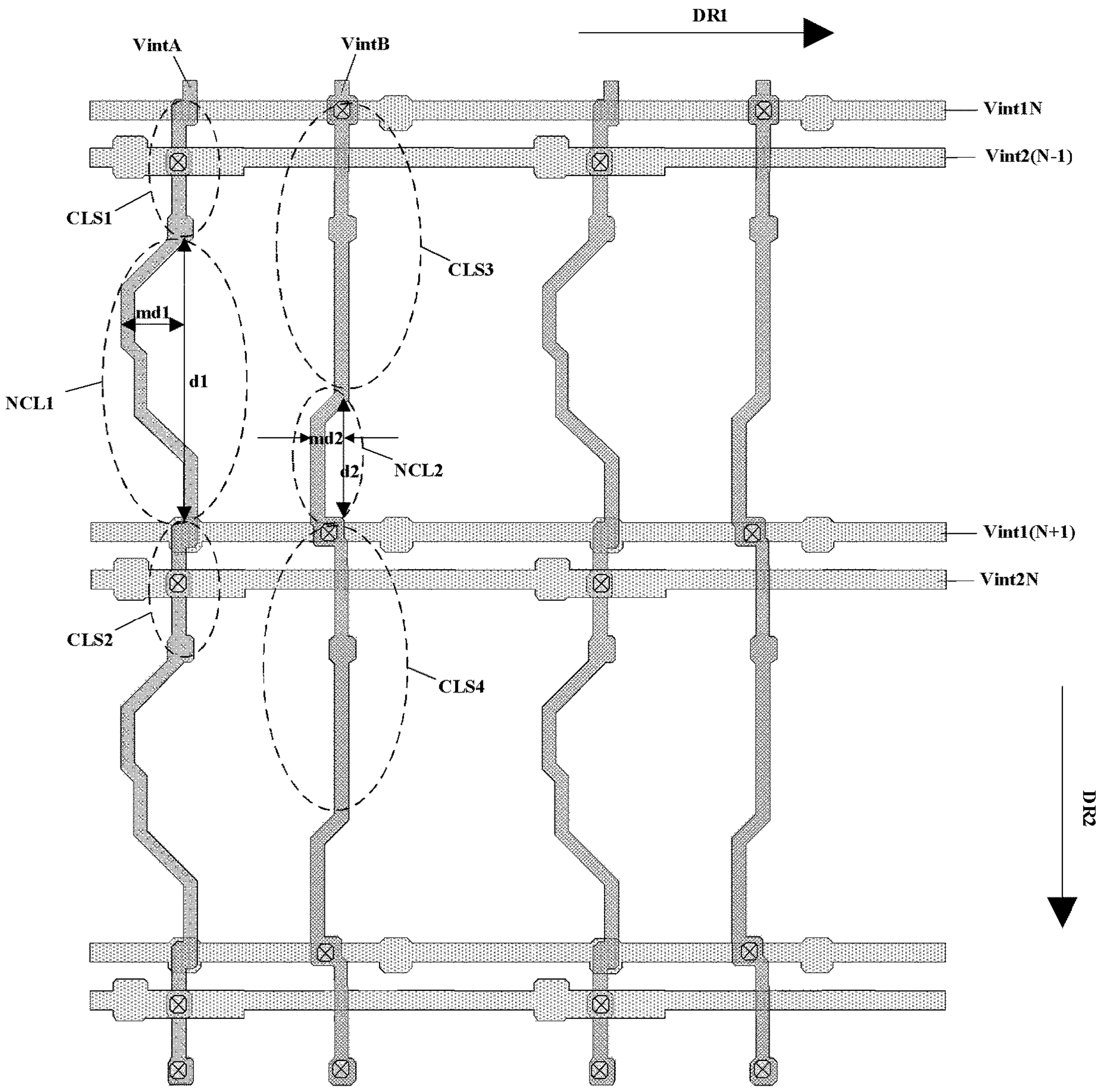
FIG. 4B is a diagram illustrating the structure of a reset signal supply network in an array substrate in some embodiments according to the present disclosure.

FIG. 4B is a diagram illustrating the structure of a reset signal supply network in an array substrate in some embodiments according to the present disclosure. Referring to FIG. 4B, the reset signal supply network in some embodiments includes a first interconnected reset signal supply network and a second interconnected reset signal supply network. In some embodiments, the first interconnected reset signal supply network includes a plurality of first reset signal lines respectively extending along the first direction DR1 and a plurality of fourth reset signal lines respectively extending along the second direction DR2. A respective first reset signal line is connected to one or more (e.g., multiple ones, or optionally all) of the plurality of fourth reset signal lines. A respective fourth reset signal line is connected to one or more (e.g., multiple ones, or optionally all) of the plurality of first reset signal lines. The plurality of first reset signal lines respectively cross over the plurality of fourth reset signal lines. In some embodiments, the second interconnected reset signal supply network includes a plurality of second reset signal lines respectively extending along the first direction DR1 and a plurality of third reset signal lines respectively extending along the second direction DR2. A respective second reset signal line is connected to one or more (e.g., multiple ones, or optionally all) of the plurality of third reset signal lines. A respective third reset signal line is connected to one or more (e.g., multiple ones, or optionally all) of the plurality of second reset signal lines. The plurality of second reset signal lines respectively cross over the plurality of third reset signal lines.

Referring to FIG. 3A, FIG. 3B, FIG. 4A, and FIG. 4B, in some embodiments, the plurality of first reset signal lines and the plurality of second reset signal lines are alternately arranged along the second direction DR2. Optionally, a respective first reset signal line in a present stage Vint1N, a respective second reset signal line in a previous adjacent stage Vint2(N−1), a respective first reset signal line in a next adjacent stage Vint1(N+1), and a respective second reset signal line in the present stage Vint2N are sequentially arranged along the second direction DR2. The respective first reset signal line in the present stage VintN and the respective second reset signal line in the present stage Vint2N are connected to a pixel driving circuit in the present stage. The respective second reset signal line in a previous adjacent stage Vint2(N−1) is connected to a pixel driving circuit in the previous adjacent stage. The respective first reset signal line in a next adjacent stage Vint1(N+1) is connected to a pixel driving circuit in the next adjacent stage.

Referring to FIG. 3A, FIG. 3B, FIG. 4A, and FIG. 4B, in some embodiments, the plurality of third reset signal lines and the plurality of fourth reset signal lines are alternately arranged along the first direction DR1. Optionally, a respective third reset signal line is in a (2k−1)-th column of K columns, K and k being positive integers, 1≤k≤(K/2)), and a respective fourth reset signal line is in a (2k)-th column of the K columns. The plurality of third reset signal lines have a same line pattern. The plurality of fourth reset signal lines have a same line pattern. A respective third reset signal line and a respective fourth reset signal line have different line patterns.

In some embodiments, the plurality of third reset signal lines are substantially parallel to each other, and the plurality of fourth reset signal lines are substantially parallel to each other. A respective third reset signal line is non-parallel to a respective fourth reset signal line.

In some embodiments, a segment (e.g., A in FIG. 4A) of a respective third reset signal line between two adjacent first reset signal lines (e.g., Vint1N and Vint1(N+1) in FIG. 4A) and a segment (e.g., B in FIG. 4A) of a respective fourth reset signal line between the two adjacent first reset signal lines are non-parallel to each other. Segments of the plurality of third reset signal lines between the two adjacent first reset signal lines are parallel to each other. Segments of the plurality of fourth reset signal lines between the two adjacent first reset signal lines are parallel to each other.

In some embodiments, a segment (e.g., C in FIG. 4A) of a respective third reset signal line between two adjacent second reset signal lines (e.g., Vint2N and Vint2(N−1) in FIG. 4A) and a segment (e.g., D in FIG. 4A) of a respective fourth reset signal line between the two adjacent second reset signal lines are non-parallel to each other. Segments of the plurality of third reset signal lines between the two adjacent second reset signal lines are parallel to each other. Segments of the plurality of fourth reset signal lines between the two adjacent second reset signal lines are parallel to each other.

In some embodiments, referring to FIG. 4B, a respective third reset signal line includes a first colinear segment CLS1, a second colinear segment CLS2, and a first non-colinear segment NCL1 connecting the first colinear segment CLS1 to the second colinear segment CLS2. The first colinear segment CLS1 and the second colinear segment CLS2 are colinear. The first non-colinear segment NCL1 is non-colinear with the first colinear segment CLS1, and is non-colinear with the second colinear segment CLS2. A respective fourth reset signal line includes a third colinear segment CLS3, a fourth colinear segment CLS4, and a second non-colinear segment NCL2 connecting the third colinear segment CLS3 to the fourth colinear segment CLS4. The third colinear segment CLS3 and the fourth colinear segment CLS4 are colinear. The second non-colinear segment NCL2 is non-colinear with the third colinear segment CLS3, and is non-colinear with the fourth colinear segment CLS4. A first distance d1 between connecting points of the first non-colinear segment NCL1 with the first colinear segment CLS1 and the second colinear segment CLS2 is different from (e.g., greater than) a second distance d2 between connecting points of the second non-colinear segment NCL2 with the third colinear segment CLS3 and the fourth colinear segment CLS4. The first non-colinear segment NCL1 deviates from a virtual line connecting the first colinear segment CLS1 and the second colinear segment CLS2 by a first maximum distance of md1. The second non-colinear segment NCL2 deviates from a virtual line connecting the third colinear segment CLS3 and the fourth colinear segment CLS4 by a second maximum distance of md2. The first maximum distance of md1 is different from (e.g., greater than) the second maximum distance of md2.

As used herein, the value of the first distance d1 allows a measurement error or a deviation in positions of the connecting points. Depending on the deviation or measurement error, values of the first distance d1 may vary by as much as 5%, e.g., 4%, 3%, 2%, 1%, or 0.5%. As used herein, the value of the second distance d2 allows a measurement error or a deviation in positions of the connecting points. Depending on the deviation or measurement error, values of the first distance d1 may vary by as much as 5%, e.g., 4%, 3%, 2%, 1%, or 0.5%.

Optionally, the first non-colinear segment NCL1 and the second non-colinear segment NCL2 are between two adjacent first reset signal lines (e.g., Vint1N and Vint1(N+1) in FIG. 4B).

Optionally, the first non-colinear segment NCL1 and the second non-colinear segment NCL2 are between two adjacent second reset signal lines (e.g., Vint2N and Vint2(N−1) in FIG. 4B).

Optionally, the first non-colinear segment NCL1 deviates from the virtual line connecting the first colinear segment CLS1 and the second colinear segment CLS2 toward a side of the array substrate (e.g., toward a left side of the array substrate in FIG. 4B), and the second non-colinear segment NCL2 deviates from the virtual line connecting the third colinear segment CLS3 and the fourth colinear segment CLS4, toward a side of the array substrate (e.g., toward a left side of the array substrate in FIG. 4B).

Figure 5A:
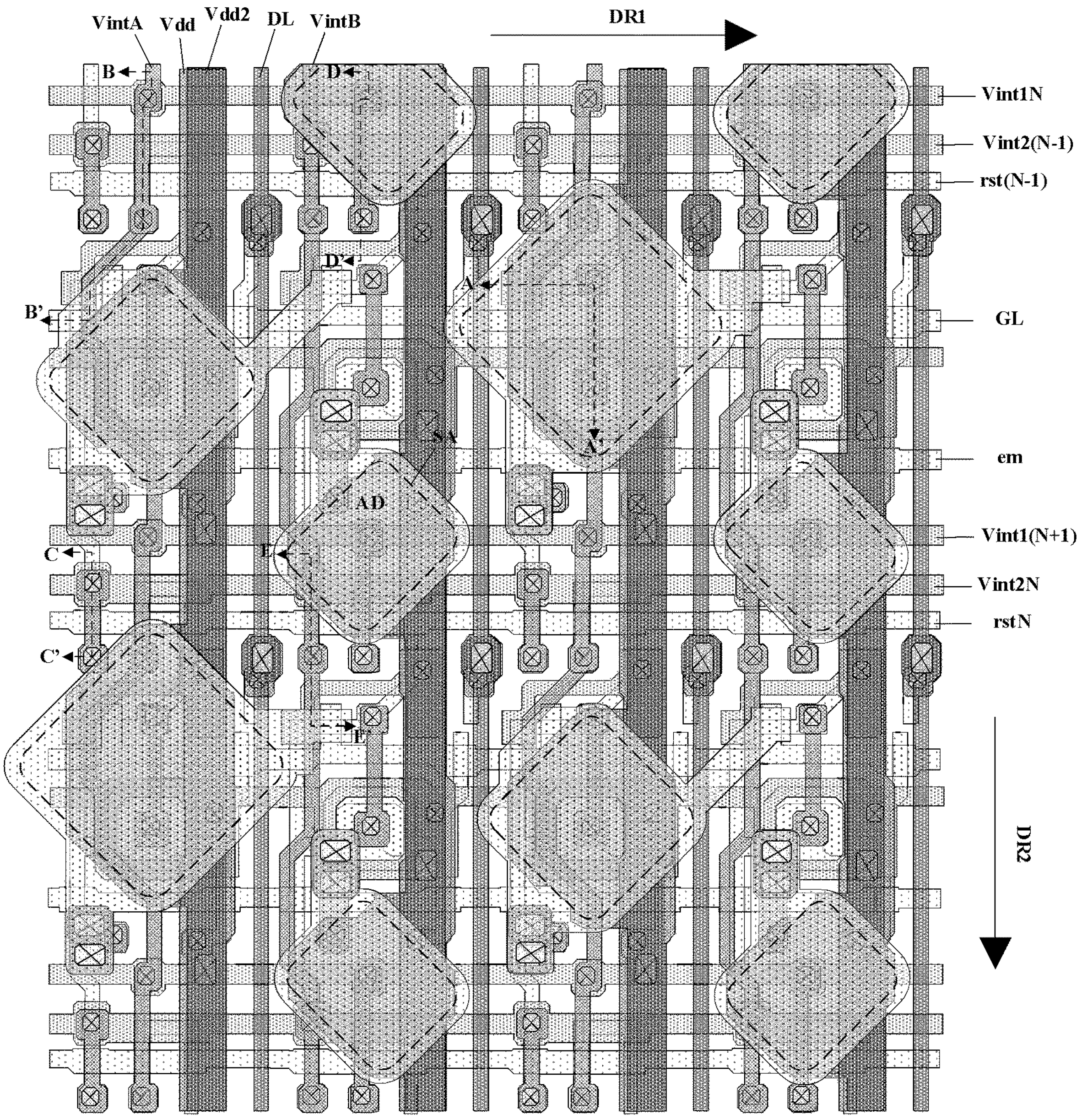
FIG. 5A is a diagram illustrating the structure of an array substrate in some embodiments according to the present disclosure.
Figure 5B:
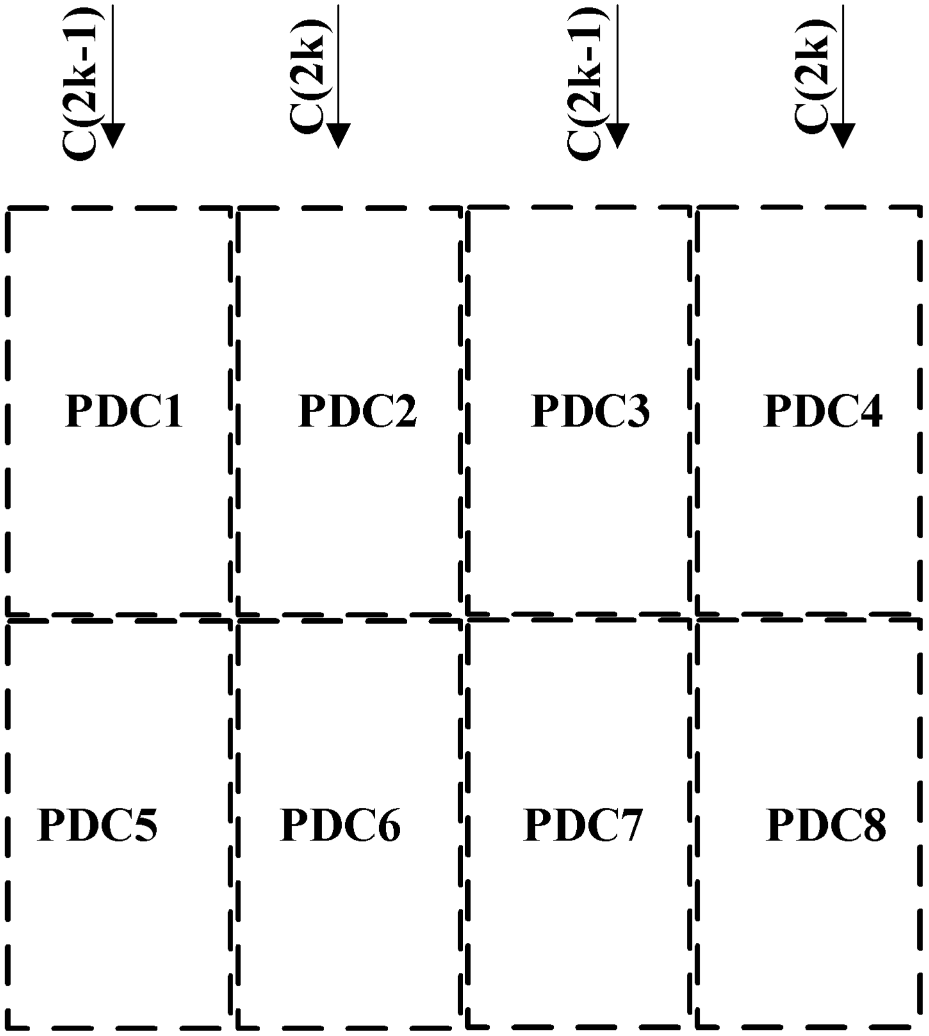
FIG. 5B is a schematic diagram illustrating an arrangement of a plurality of pixel driving circuits in an array substrate depicted in FIG. 5A.

FIG. 5A is a diagram illustrating the structure of an array substrate in some embodiments according to the present disclosure. FIG. 5B is a schematic diagram illustrating an arrangement of a plurality of pixel driving circuits in an array substrate depicted in FIG. 5A. FIG. 5A and FIG. 5B depicts a portion of the array substrate having eight pixel driving circuits, including PDC1, PDC2, PDC3, PDC4, PDC5, PDC6, PDC7, and PDC8. The pixel driving circuits are arranged in columns, including (2k−1)-th columns C(2k−1) and (2k)-th columns C(2k).

Figure 5C:
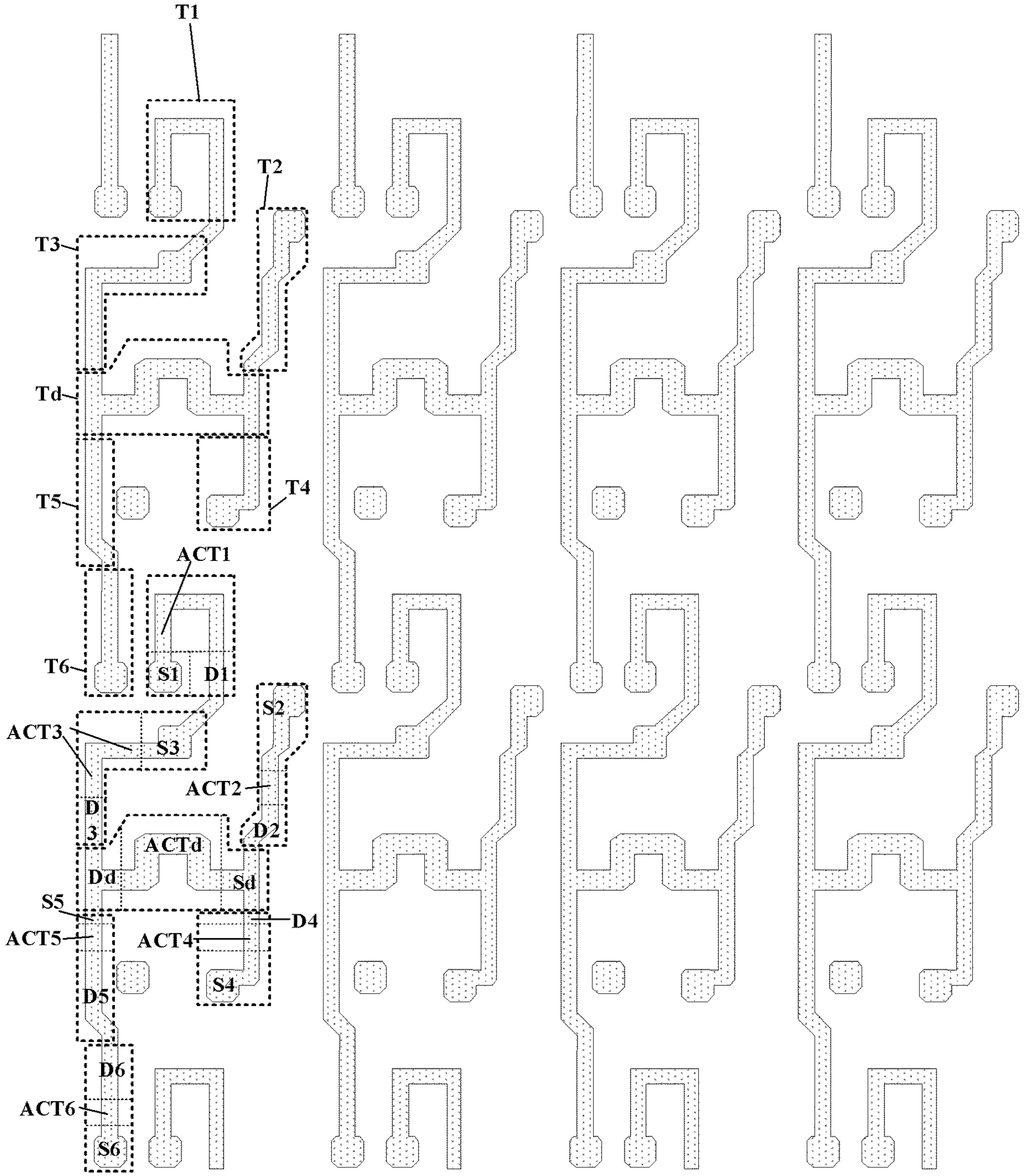
FIG. 5C is a diagram illustrating the structure of a semiconductor material layer in an array substrate depicted in FIG. 5A.
Figure 5D:
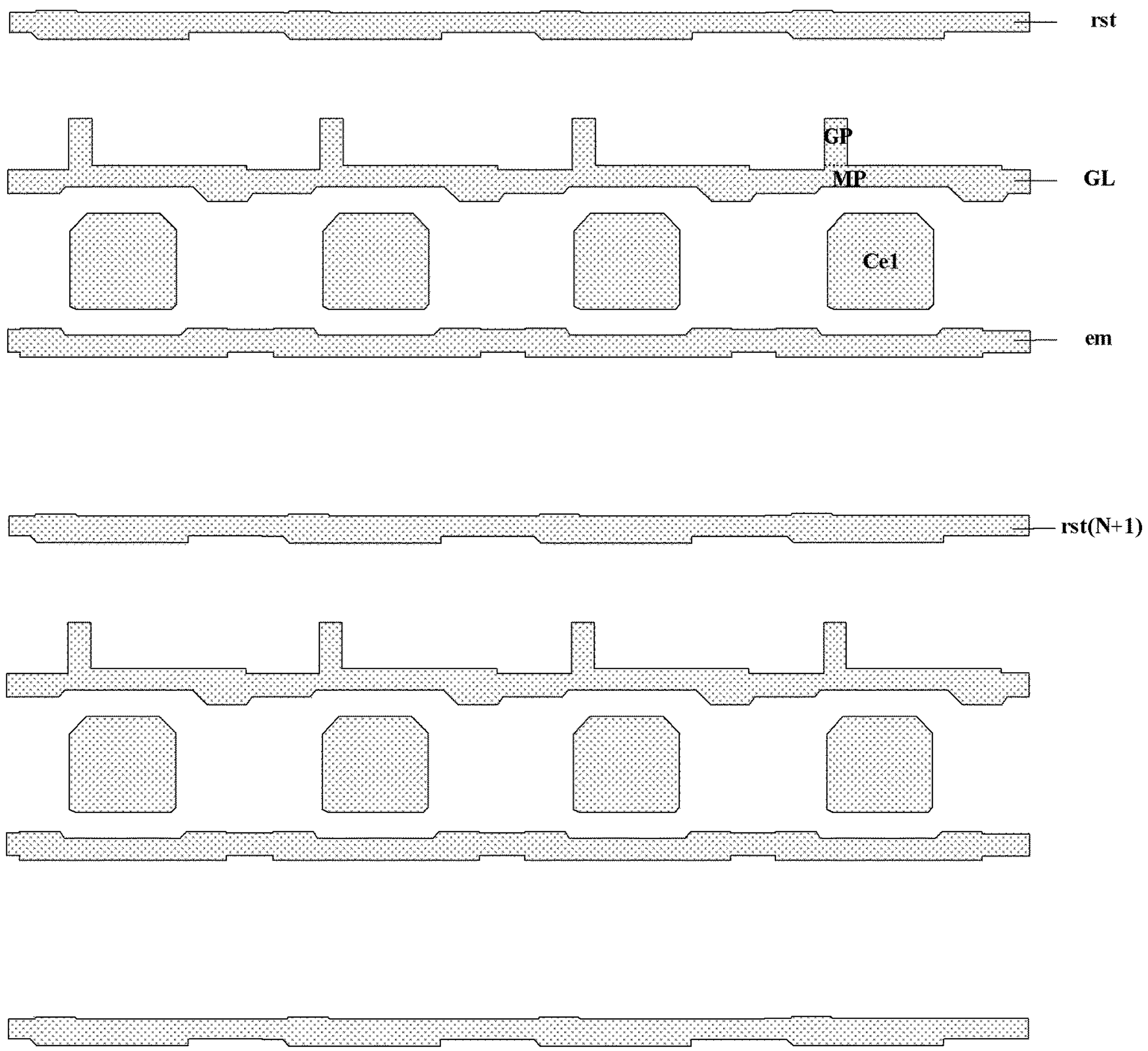
FIG. 5D is a diagram illustrating the structure of a first conductive layer in an array substrate depicted in FIG. 5A.
Figure 5E:
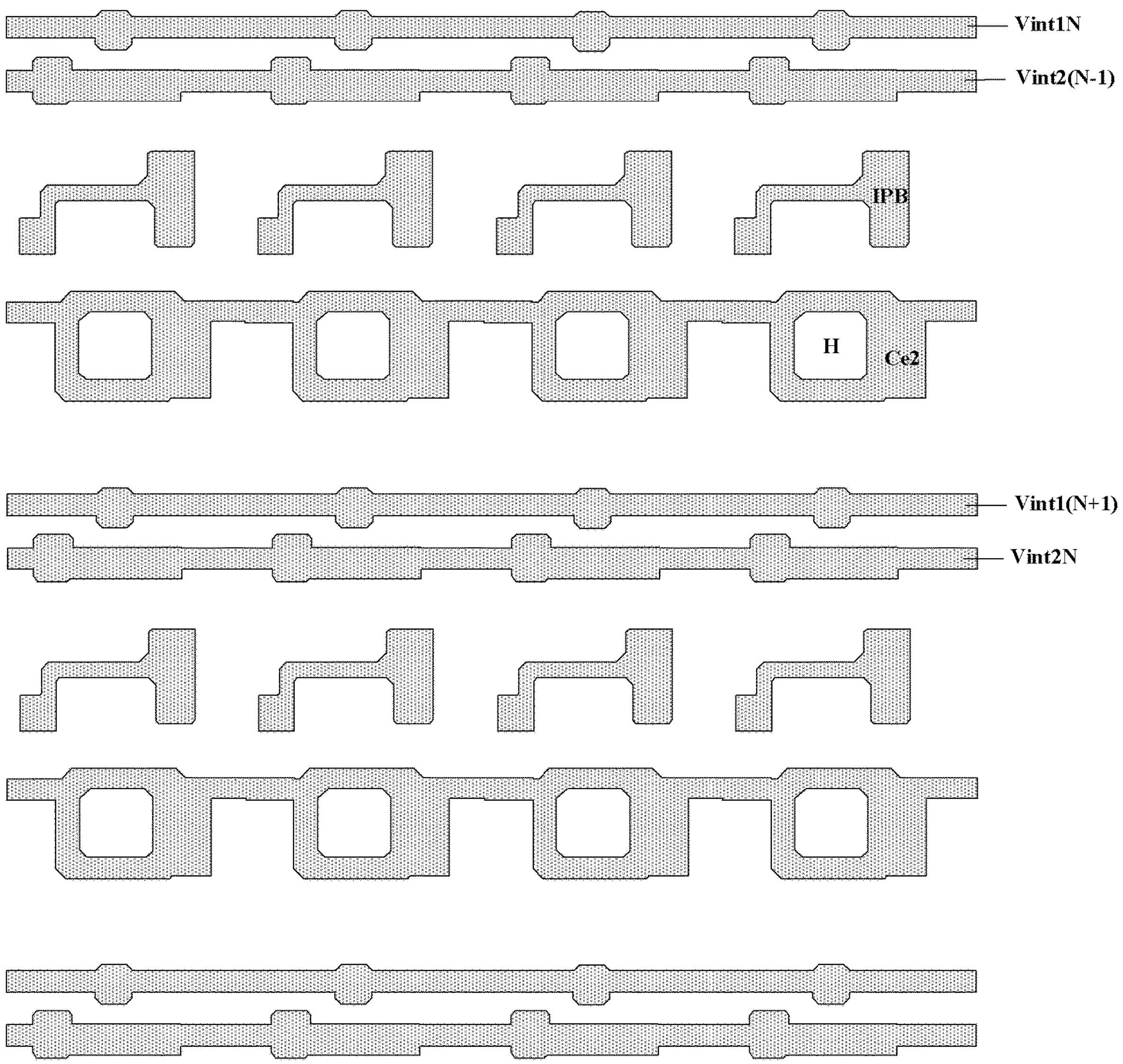
FIG. 5E is a diagram illustrating the structure of a second conductive layer in an array substrate depicted in FIG. 5A.
Figure 5F:
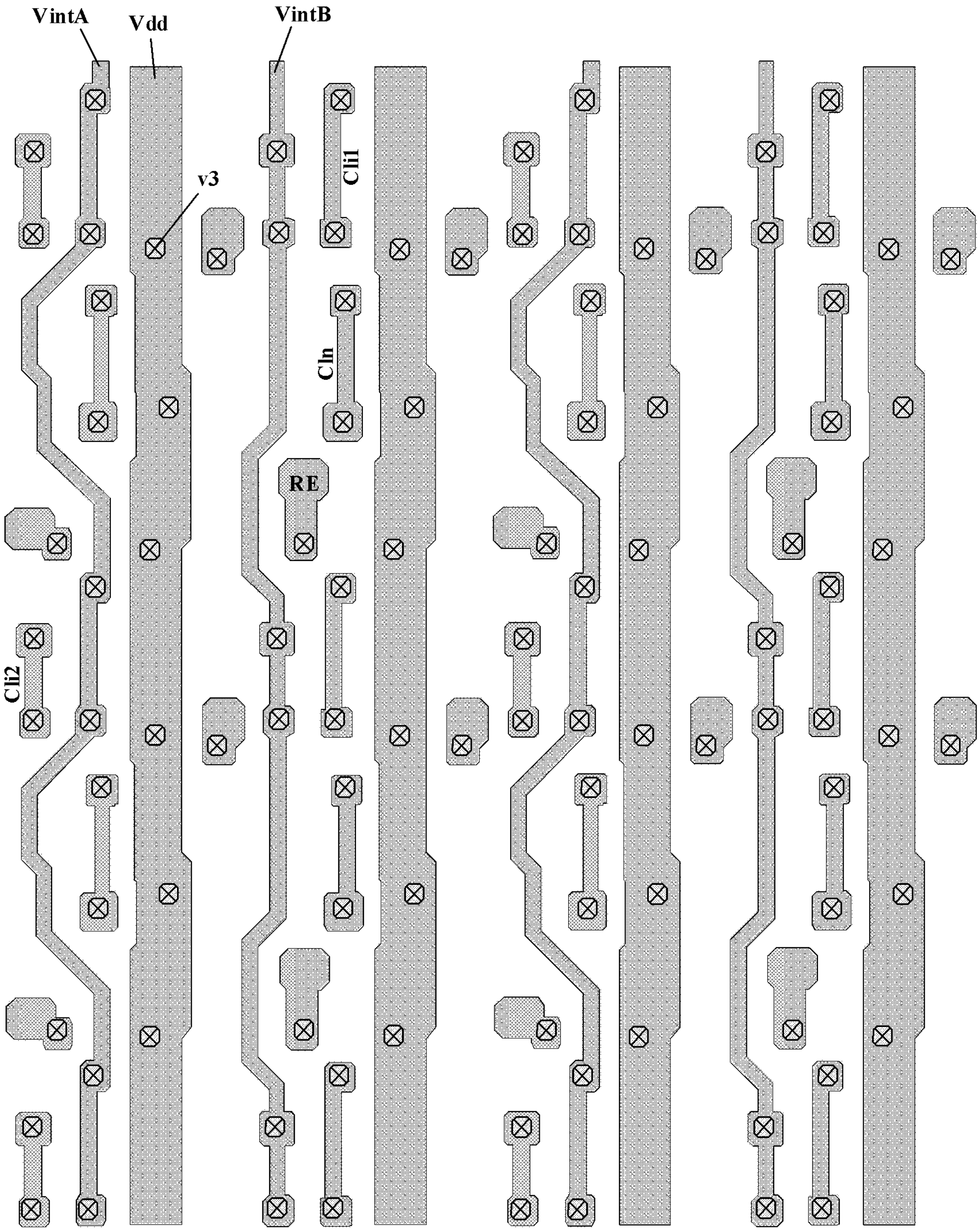
FIG. 5F is a diagram illustrating the structure of a first signal line layer in an array substrate depicted in FIG. 5A.
Figure 5G:
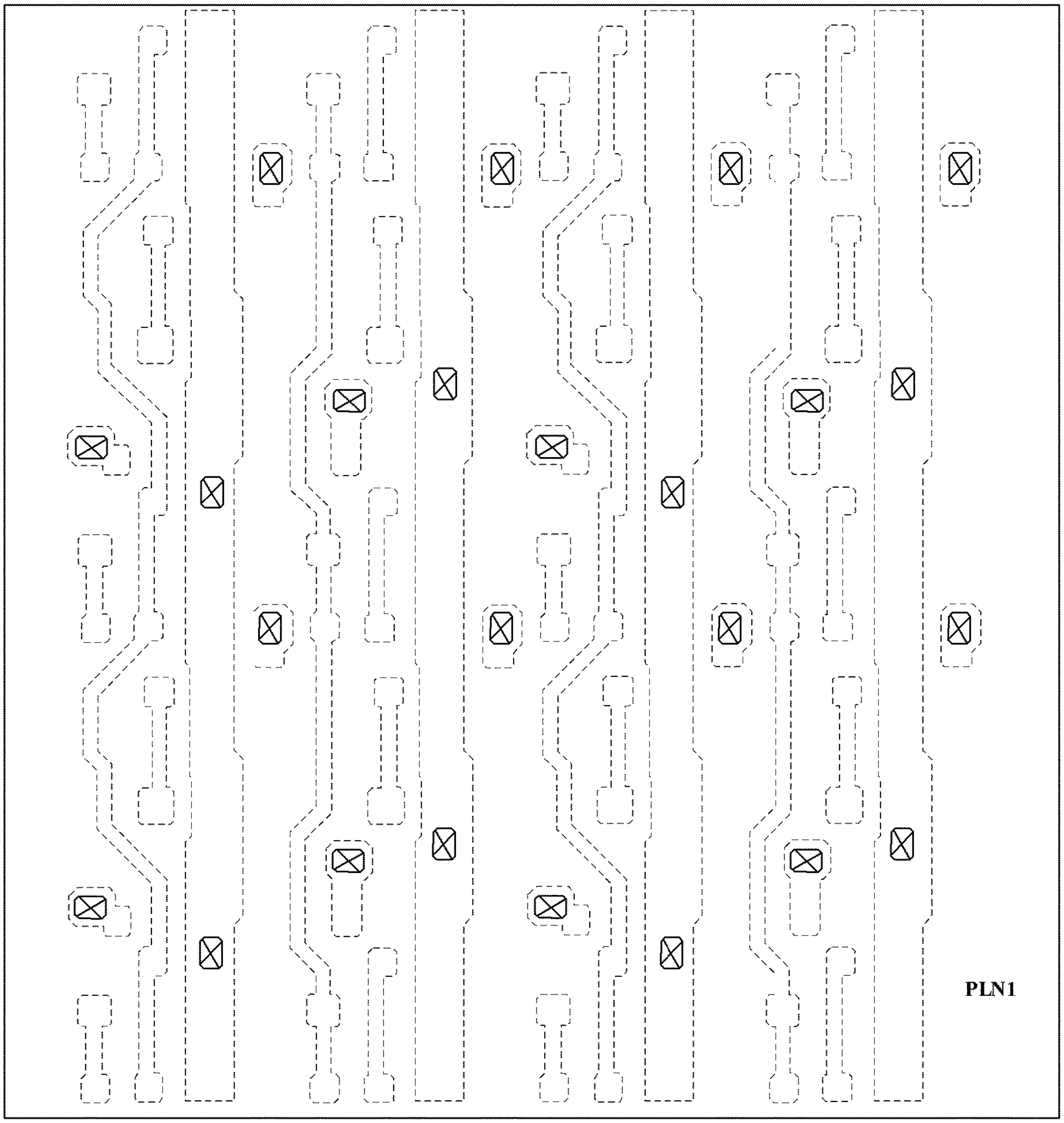
FIG. 5G is a diagram illustrating the structure of a first planarization layer in an array substrate depicted in FIG. 5A.
Figure 5H:
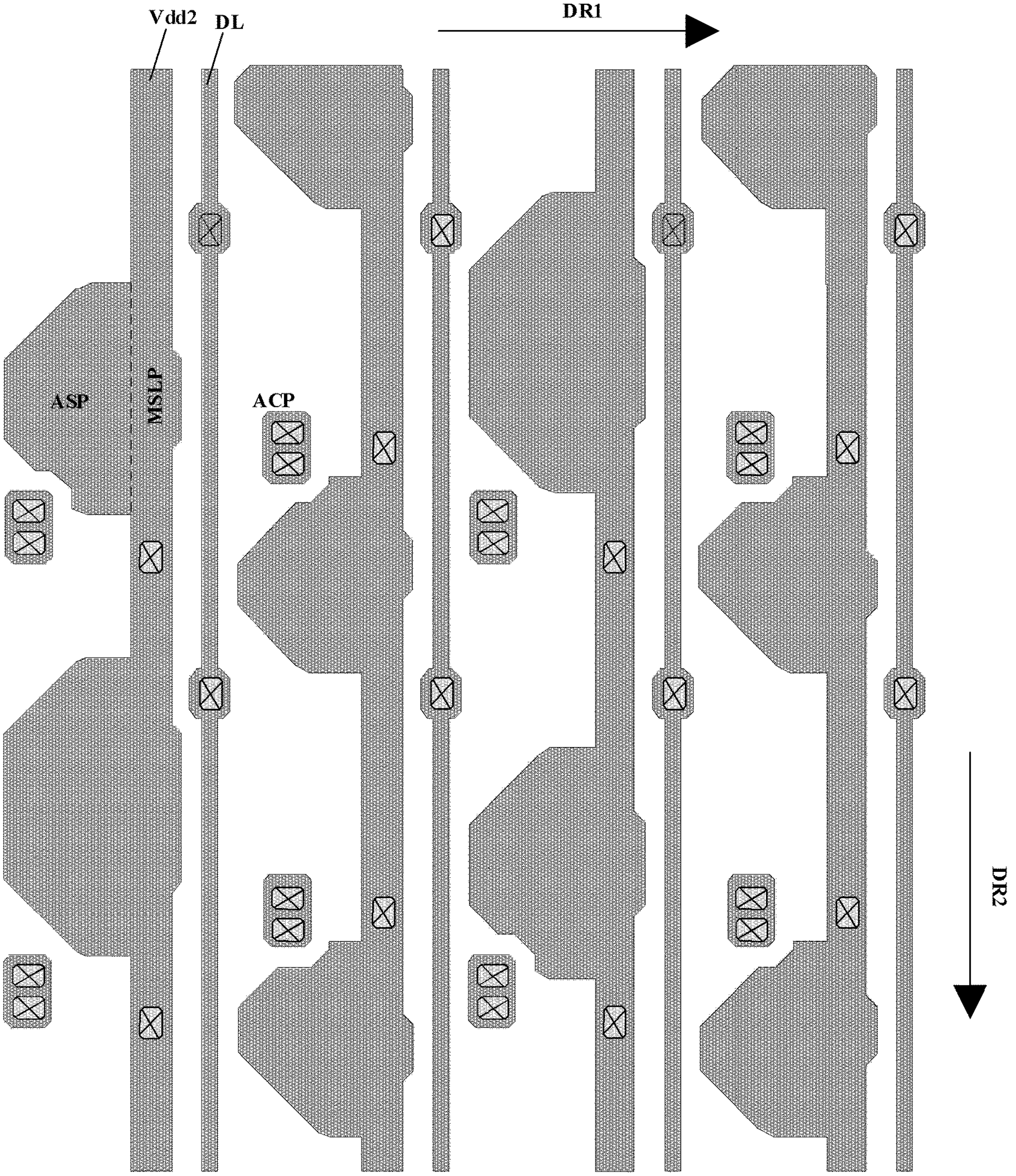
FIG. 5H is a diagram illustrating the structure of a second signal line layer in an array substrate depicted in FIG. 5A.
Figure 5I:
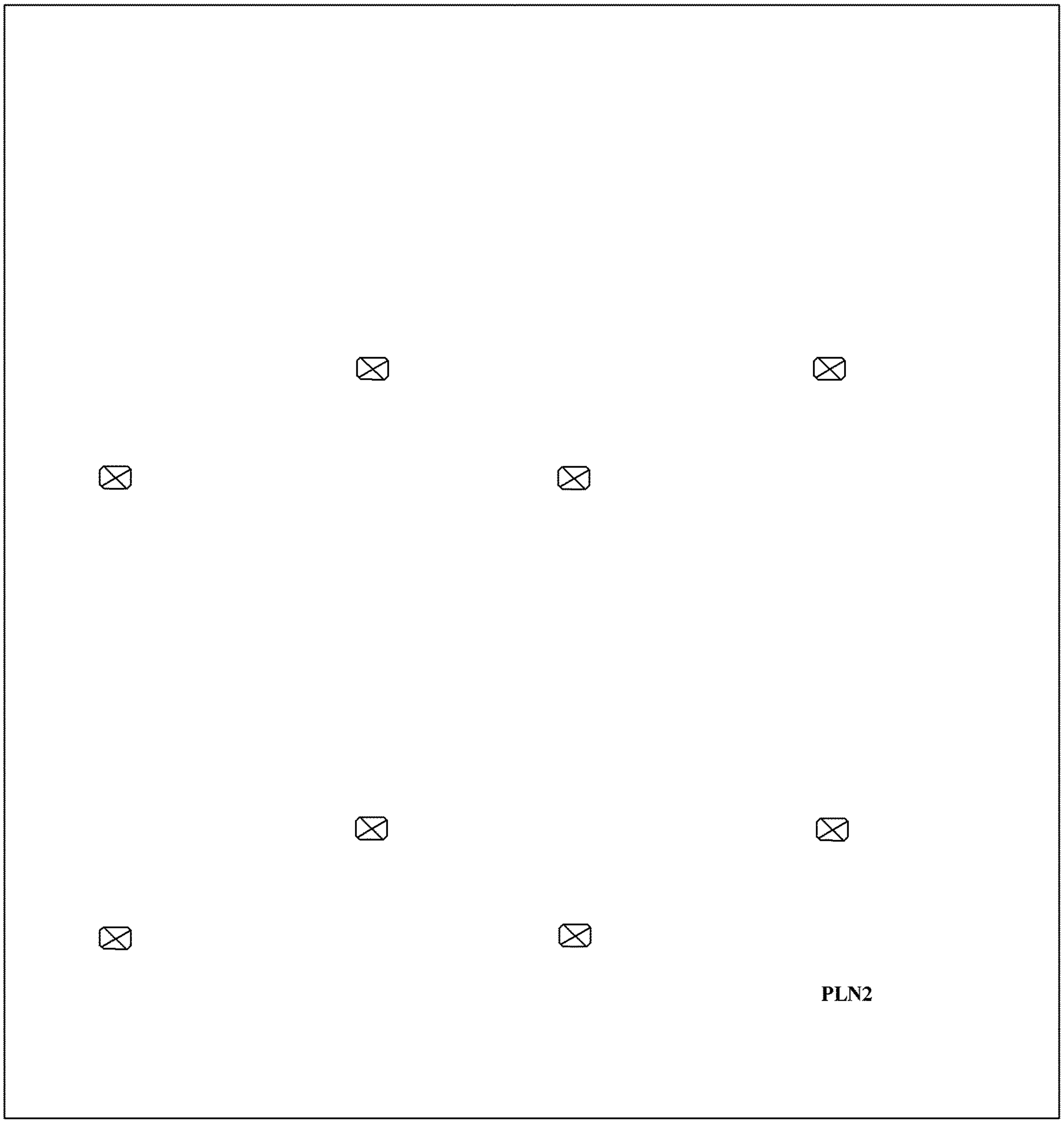
FIG. 5I is a diagram illustrating the structure of a second planarization layer in an array substrate depicted in FIG. 5A.
Figure 5J:
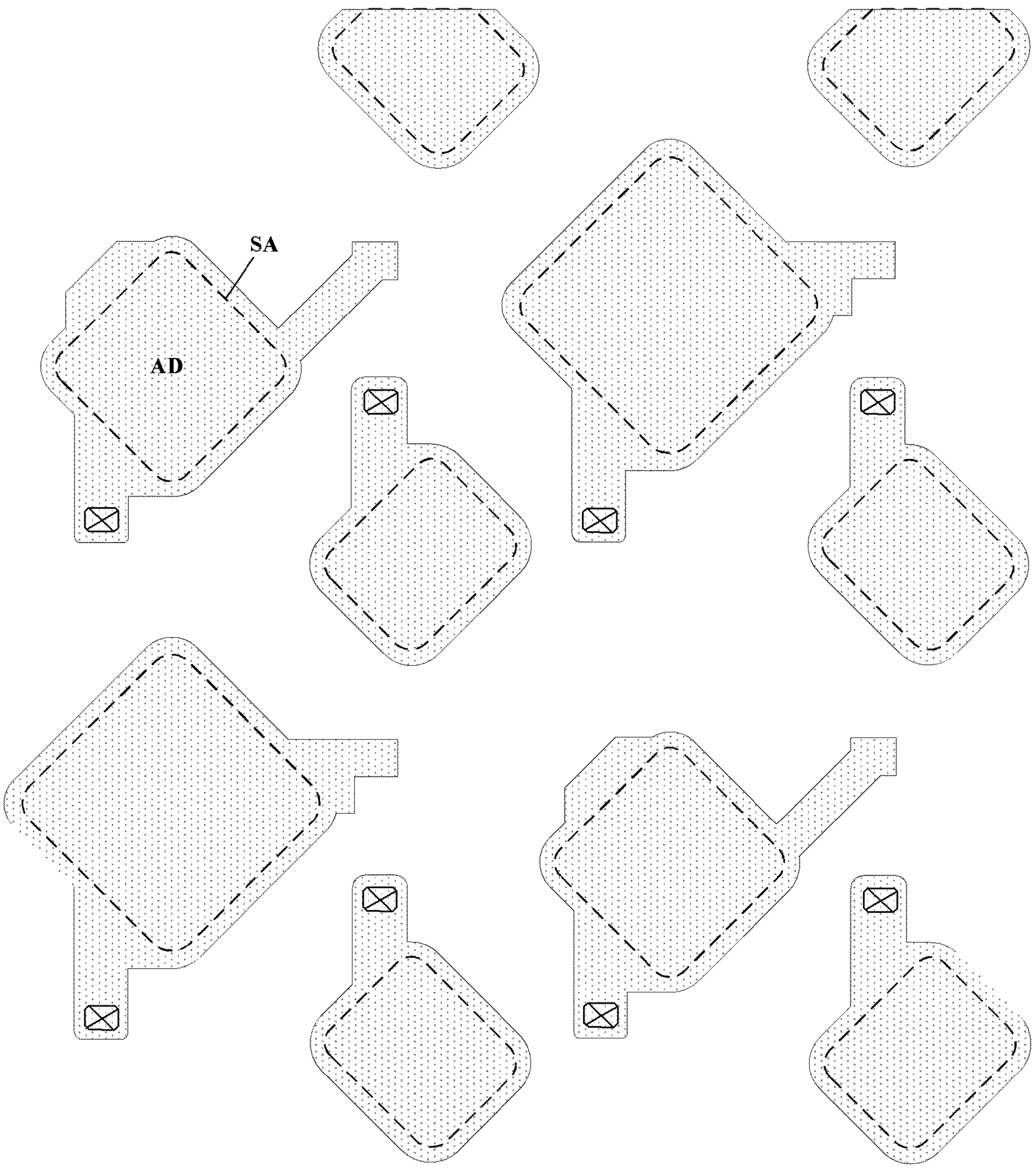
FIG. 5J is a diagram illustrating the structure of an anode layer in an array substrate depicted in FIG. 5A.
Figure 5K:
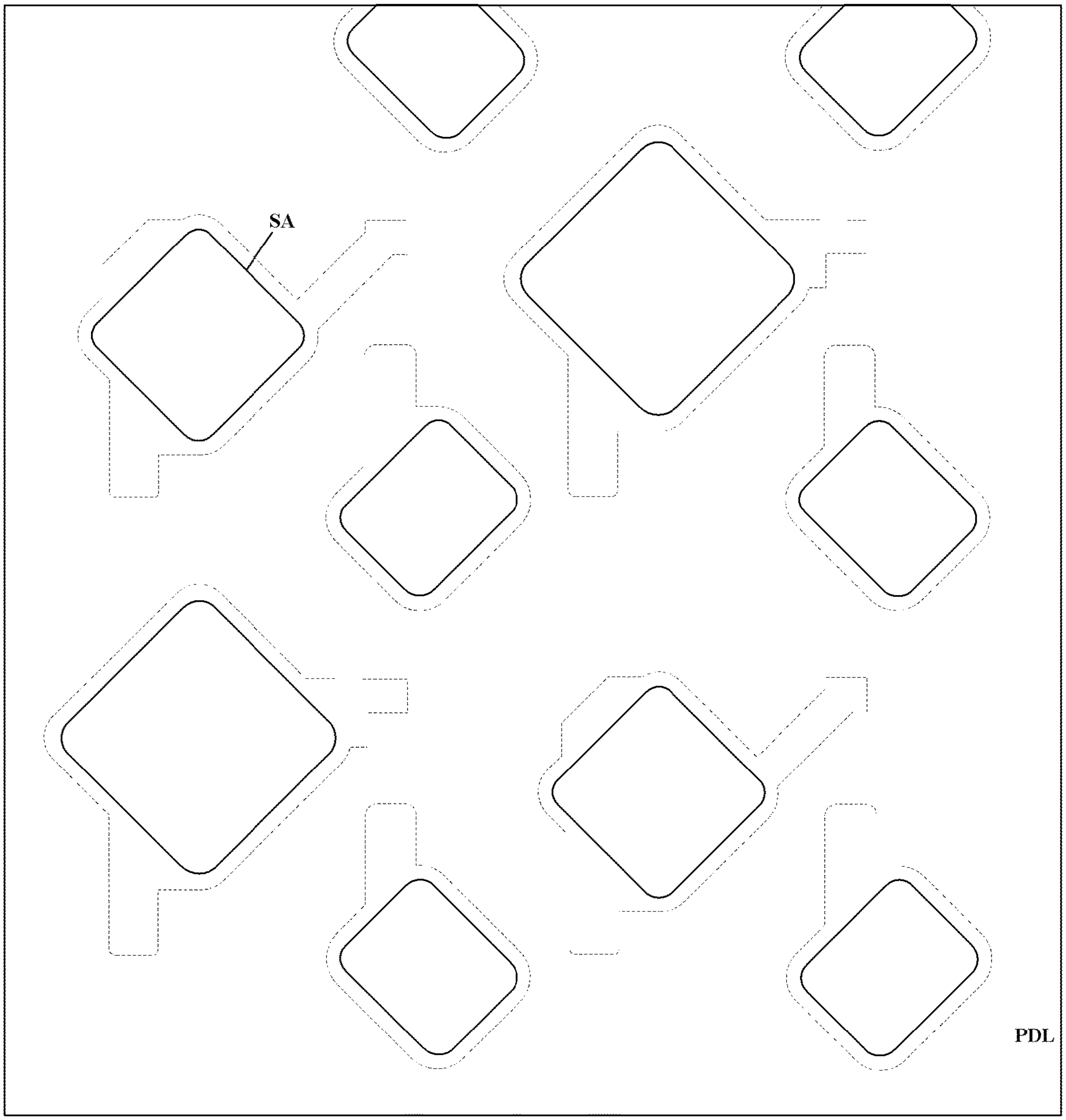
FIG. 5K is a diagram illustrating the structure of a pixel definition layer in an array substrate depicted in FIG. 5A.
Figure 6A:
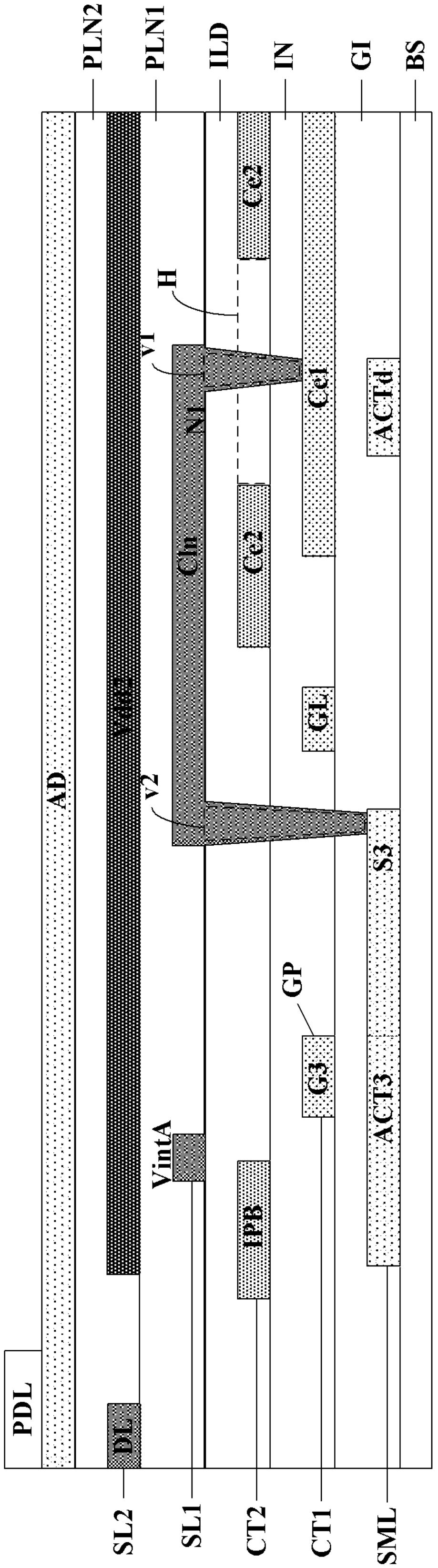
FIG. 6A is a cross-sectional view along an A-A' line in FIG. 5A.
Figure 6B:
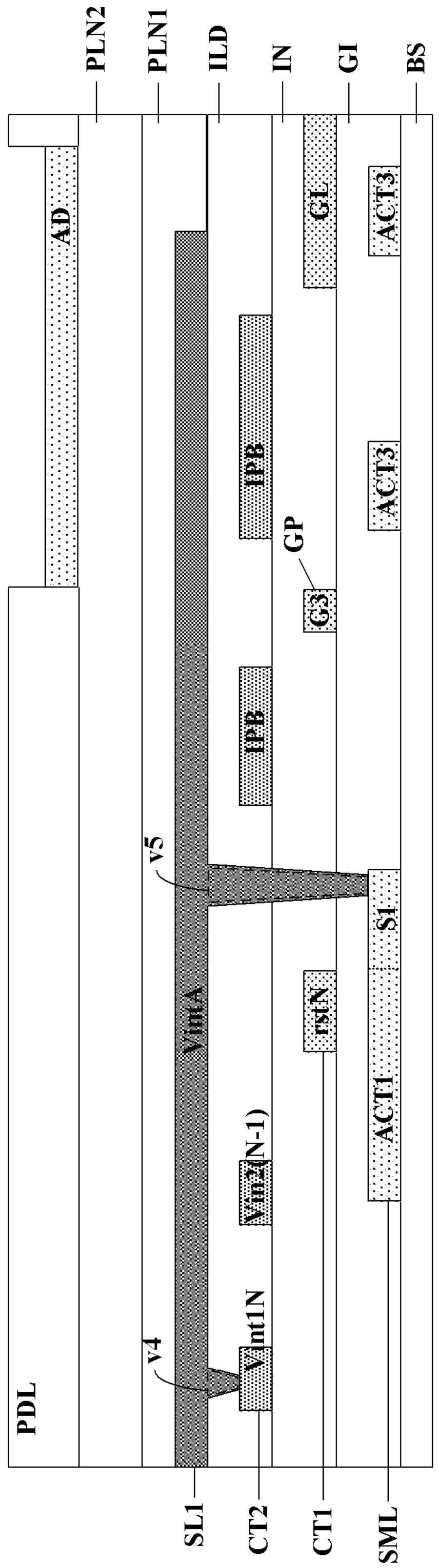
FIG. 6B is a cross-sectional view along a B-B' line in FIG. 5A.
Figure 6C:
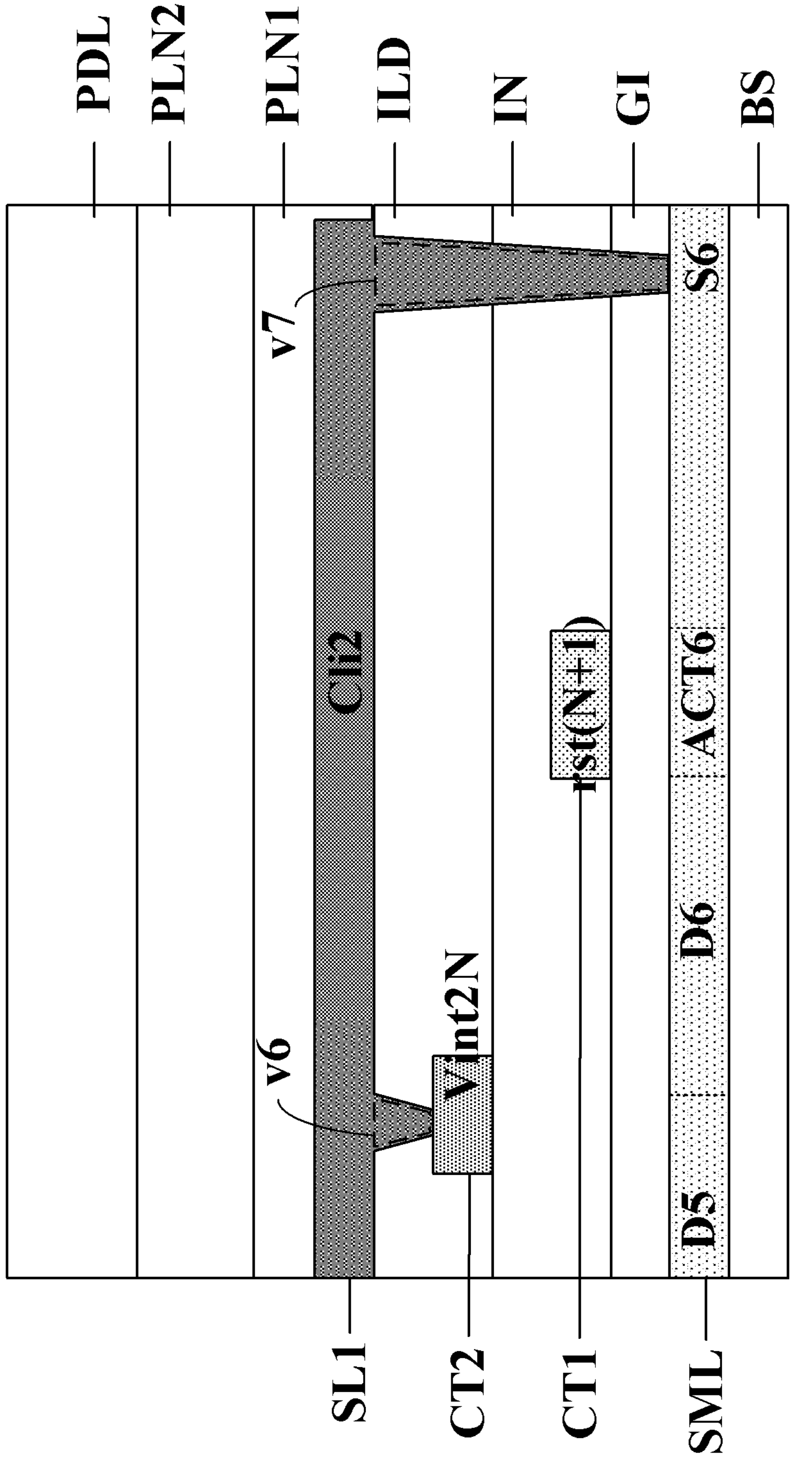
FIG. 6C is a cross-sectional view along a C-C' line in FIG. 5A.
Figure 6D:
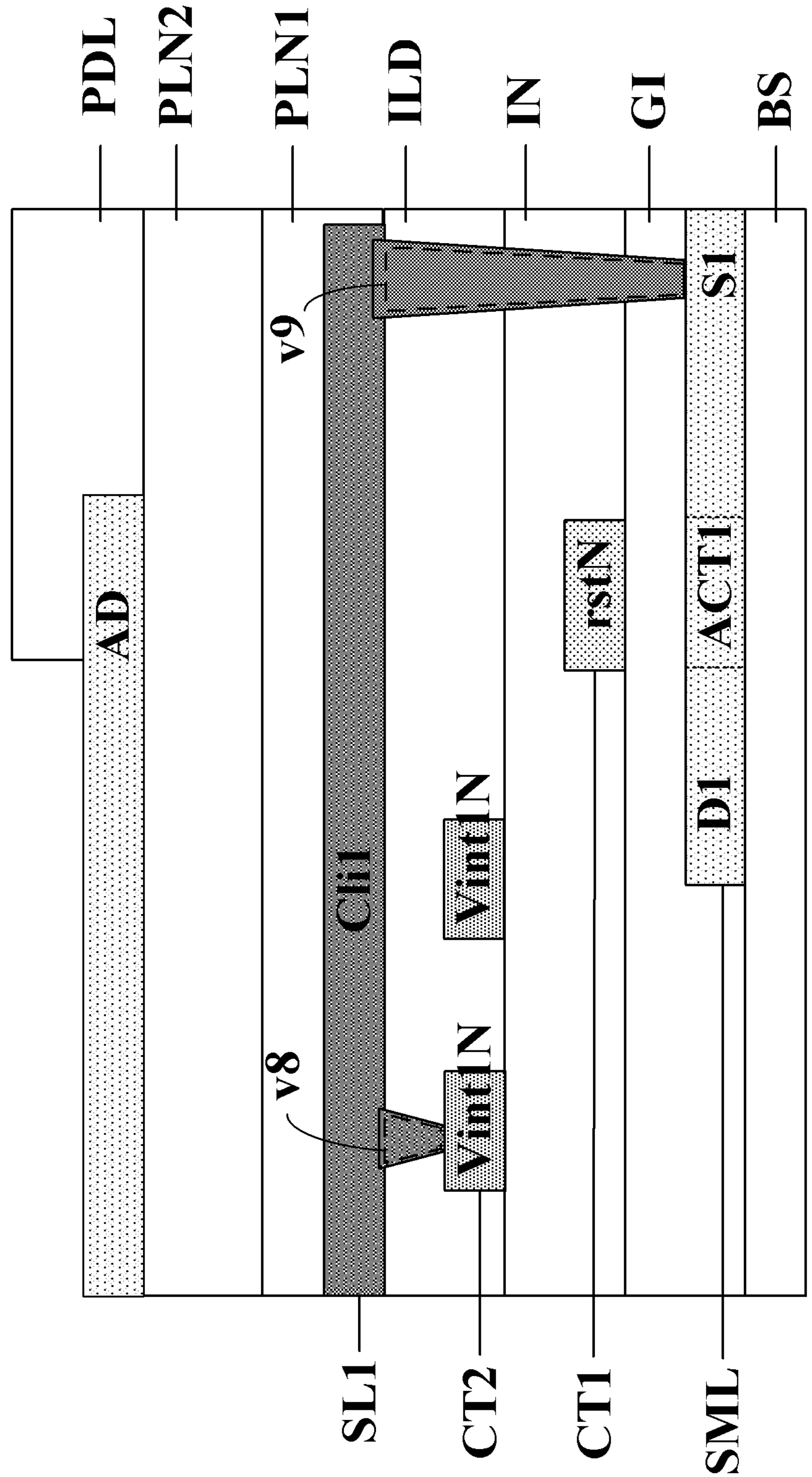
FIG. 6D is a cross-sectional view along a D-D' line in FIG. 5A.
Figure 6E:
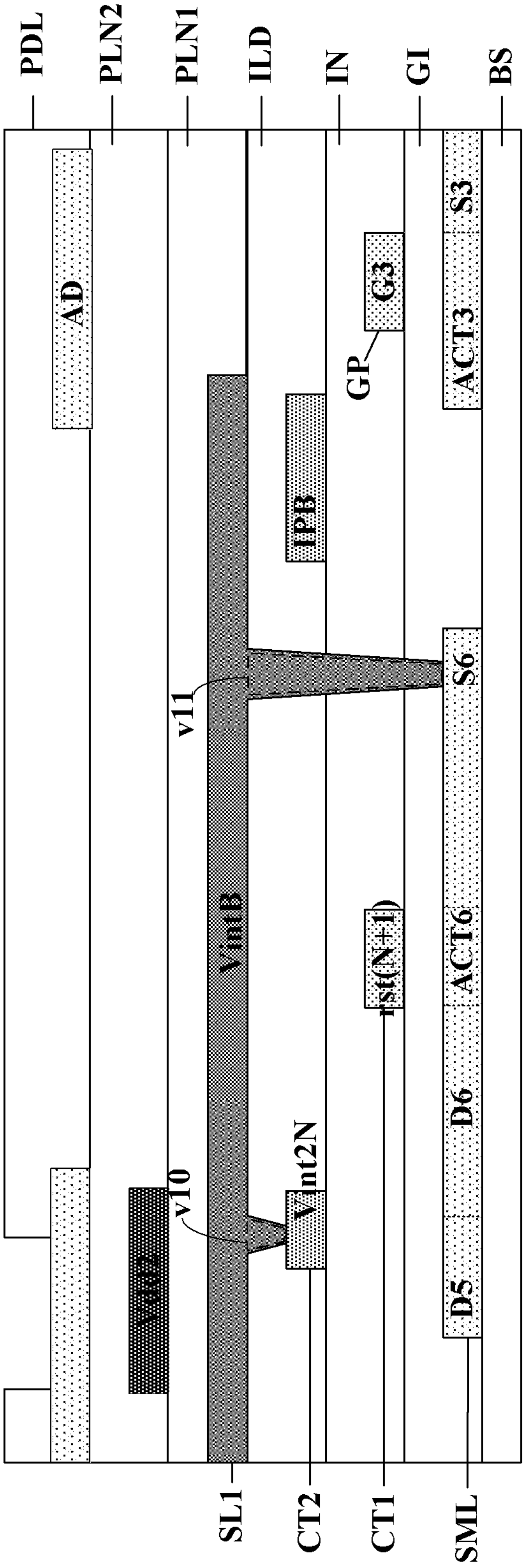
FIG. 6E is a cross-sectional view along a E-E' line in FIG. 5A.

FIG. 5C is a diagram illustrating the structure of a semiconductor material layer in an array substrate depicted in FIG. 5A. FIG. 5D is a diagram illustrating the structure of a first conductive layer in an array substrate depicted in FIG. 5A. FIG. 5E is a diagram illustrating the structure of a second conductive layer in an array substrate depicted in FIG. 5A. FIG. 5F is a diagram illustrating the structure of a first signal line layer in an array substrate depicted in FIG. 5A. FIG. 5G is a diagram illustrating the structure of a first planarization layer in an array substrate depicted in FIG. 5A. FIG. 5H is a diagram illustrating the structure of a second signal line layer in an array substrate depicted in FIG. 5A. FIG. 5I is a diagram illustrating the structure of a second planarization layer in an array substrate depicted in FIG. 5A. FIG. 5J is a diagram illustrating the structure of an anode layer in an array substrate depicted in FIG. 5A. FIG. 5K is a diagram illustrating the structure of a pixel definition layer in an array substrate depicted in FIG. 5A. FIG. 6A is a cross-sectional view along an A-A' line in FIG. 5A. FIG. 6B is a cross-sectional view along a B-B' line in FIG. 5A. FIG. 6C is a cross-sectional view along a C-C' line in FIG. 5A. FIG. 6D is a cross-sectional view along a D-D' line in FIG. 5A. FIG. 6E is a cross-sectional view along a E-E' line in FIG. 5A.

Referring to FIG. 5A to FIG. 5K, and FIG. 6A to FIG. 6E, in some embodiments, the display panel includes a base substrate BS, a semiconductor material layer SML on the base substrate BS, a gate insulating layer GI on a side of the semiconductor material layer SML away from the base substrate BS, a first conductive layer CT1 on a side of the gate insulating layer GI away from the semiconductor material layer SML, an insulating layer IN on a side of the first conductive layer away from the gate insulating layer GI, a second conductive layer CT2 on a side of the insulating layer IN away from the first conductive layer CT1, an inter-layer dielectric layer ILD on a side of the second conductive layer CT2 away from the insulating layer IN, a first signal line layer SL1 on a side of the inter-layer dielectric layer ILD away from the second conductive layer CT2, a planarization layer PLN on a side of the first signal line layer SL1 away from the inter-layer dielectric layer ILD, and a second signal line layer SL2 on a side of the planarization layer PLN1 away from the first signal line layer SL1.

Referring to FIG. 2A, FIG. 2B, FIG. 5A, and FIG. 5C, a respective pixel driving circuit is annotated with labels indicating regions corresponding to the plurality of transistors in the respective pixel driving circuit, including the first transistor T1, the second transistor T2, the third transistor T3, the fourth transistor T4, the fifth transistor T5, the sixth transistor T6, and the driving transistor Td. The respective pixel driving circuit is further annotated with labels indicating components of each of the plurality of transistors in the pixel driving circuit. For example, the first transistor T1 includes an active layer ACT1, a source electrode S1, and a drain electrode D1. The second transistor T2 includes an active layer ACT2, a source electrode S2, and a drain electrode D2. The third transistor T3 includes an active layer ACT3, a source electrode S3, and a drain electrode D3. The fourth transistor T4 includes an active layer ACT4, a source electrode S4, and a drain electrode D4. The fifth transistor T5 includes an active layer ACT5, a source electrode S5, and a drain electrode D5. The sixth transistor T6 includes an active layer ACT6, a source electrode S6, and a drain electrode D6. The driving transistor Td includes an active layer ACTd, a source electrode Sd, and a drain electrode Dd. In one example, the active layers (ACT1, ACT2, ACT3, ACT4, ACT5, ACT6, and ACTd) of the transistors (T1, T2, T3, T4, T5, T6, and Td) in the respective pixel driving circuit are parts of a unitary structure. In another example, the active layers (ACT1, ACT2, ACT3, ACT4, ACT5, ACT6, and ACTd), the source electrodes (S1, S2, S3, S4, S5, S6, and Sd), and the drain electrodes (D1, D2, D3, D4, D5, D6, and Dd) of the transistors (T1, T2, T3, T4, T5, T6, and Td) in the respective pixel driving circuit are parts of a unitary structure. In another example, the active layers (ACT1, ACT2, ACT3, ACT4, ACT5, ACT6, and ACTd) of the transistors (T1, T2, T3, T4, T5, T6, and Td) are in a same layer. In another example, the active layers (ACT1, ACT2, ACT3, ACT4, ACT5, ACT6, and ACTd), the source electrodes (S1, S2, S3, S4, S5, S6, and Sd), and the drain electrodes (D1, D2, D3, D4, D5, D6, and Dd) of the transistors (T1, T2, T3, T4, T5, T6, and Td) are in a same layer.

As used herein, the active layer refers to a component of the transistor comprising at least a portion of the semiconductor material layer whose orthographic projection on the base substrate overlaps with an orthographic projection of a gate electrode on the base substrate. As used herein, a source electrode refers to a component of the transistor connected to one side of the active layer, and a drain electrode refers to a component of the transistor connected to another side of the active layer. In the context of a double-gate type transistor (for example, the third transistor T3), the active layer refers to a component of the transistor comprising a first portion of the semiconductor material layer whose orthographic projection on the base substrate overlaps with an orthographic projection of a first gate on the base substrate, a second portion of the semiconductor material layer whose orthographic projection on the base substrate overlaps with an orthographic projection of a second gate on the base substrate, and a third portion between the first portion and the second portion. In the context of a double-gate type transistor, a source electrode refers to a component of the transistor connected to a side of the first portion distal to the third portion, and a drain electrode refers to a component of the transistor connected to a side of the second portion distal to the third portion.

Referring to FIG. 2A, FIG. 2B, FIG. 5A, and FIG. 5D, the first conductive layer in some embodiments includes a plurality of gate lines GL, a plurality of reset control signal lines (including a respective reset control signal line of a present stage rstN and a reset control signal line of a next stage rst(N+1)), a plurality of light emitting control signal lines em, and a first capacitor electrode Ce1 of the storage capacitor Cst. Various appropriate electrode materials and various appropriate fabricating methods may be used to make the first conductive layer. For example, a conductive material may be deposited on the substrate by a plasma-enhanced chemical vapor deposition (PECVD) process and patterned. Examples of appropriate conductive materials for making the first conductive layer include, but are not limited to, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. Optionally, the plurality of gate lines GL, the plurality of reset control signal lines, the plurality of light emitting control signal lines em, and the first capacitor electrode Ce1 are in a same layer.

As used herein, the term "same layer" refers to the relationship between the layers simultaneously formed in the same step. In one example, the plurality of gate lines GL and the first capacitor electrode Ce1 are in a same layer when they are formed as a result of one or more steps of a same patterning process performed in a same layer of material. In another example, the plurality of gate lines GL and the first capacitor electrode Ce1 can be formed in a same layer by simultaneously performing the step of forming the plurality of gate lines GL, and the step of forming the first capacitor electrode Ce1. The term "same layer" does not always mean that the thickness of the layer or the height of the layer in a cross-sectional view is the same.

Referring to FIG. 2A, FIG. 2B, FIG. 5A, and FIG. 5E, the second conductive layer in some embodiments includes a plurality of first reset signal lines (including a respective first reset signal line of a present stage Vint1N and a respective first reset signal line of a next adjacent stage Vinit1(N+1)), a plurality of second reset signal lines (including a respective second reset signal line of a present stage Vint2N and a respective second reset signal line of a previous adjacent stage Vinit1(N+1)), an interference preventing block IPB and a second capacitor electrode Ce2 of the storage capacitor Cst. The interference preventing block IPB can effectively reduce the cross-talk, particularly vertical cross-talk between the N1 node of the adjacent data lines. Various appropriate conductive materials and various appropriate fabricating methods may be used to make the second conductive layer. For example, a conductive material may be deposited on the substrate by a plasma-enhanced chemical vapor deposition (PECVD) process and patterned. Examples of appropriate conductive materials for making the second conductive layer include, but are not limited to, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. Optionally, the plurality of first reset signal lines, the plurality of second reset signal lines, the second capacitor electrode Ce2, and the interference preventing block IPB are in a same layer.

Referring to FIG. 2A, FIG. 2B, FIG. 5A, and FIG. 5F, the first signal line layer in some embodiments includes a plurality of voltage supply lines Vdd, a node connecting line Cln, a first initialization connecting line Cli1, a second initialization connecting line Cli2, a relay electrode RE, a plurality of third reset signal lines (including a respective third reset signal line VintA in a (2k−1)-th column of K columns), and a plurality of fourth reset signal lines (including a respective fourth reset signal line VintB in a (2k)-th column). The node connecting line Cln connects the first capacitor electrode Ce1 and the source electrode of the third transistor T3 in a respective pixel driving circuit together.

Optionally, the first initialization connecting line Cli1 is present in a (2k)-th column, and absent in a (2k−1)-th column. Optionally, the respective third reset signal line VintA is present in the (2k−1)-th column, and absent in the (2k)-th column. In the (2k−1)-th column, transmission of the reset signal is not accomplished by discrete initialization connecting lines, provided by the respective third reset signal line VintA which is a unitary signal line extending through the (2k−1)-th column. Thus, the first initialization connecting line Cli1 is absent in a (2k−1)-th column.

Optionally, the second initialization connecting line Cli2 is present in the (2k−1)-th column, and absent in the (2k)-th column. Optionally, the respective fourth reset signal line VintB is present in the (2k)-th column, and absent in the (2k−1)-th column. In the (2k)-th column, transmission of the reset signal is not accomplished by discrete initialization connecting lines, provided by the respective fourth reset signal line VintB which is a unitary signal line extending through the (2k)-th column. Thus, the second initialization connecting line Cli2 is absent in a (2k)-th column.

A respective third reset signal line VintA in the (2k−1)-th column connects a respective first reset signal line of the plurality of first reset signal lines (e.g., the respective first reset signal line of the present stage Vint1N) and the source electrode S1 of the first transistor T1 in a respective pixel driving circuit in the (2k−1)-th column together.

The first initialization connecting line Cli1 in the (2k)-th column connects a respective first reset signal line of the plurality of first reset signal lines (e.g., the respective first reset signal line of the present stage Vint1N) and the source electrode S1 of the first transistor T1 in a respective pixel driving circuit in the (2k)-th column together.

The respective fourth reset signal line VintB in the (2k)-th column connects a respective second reset signal line of the plurality of second reset signal lines (e.g., the respective second reset signal line of the present stage Vint2N) and the source electrode S6 of the sixth transistor T6 in the respective pixel driving circuit in the (2k)-th column together.

The second initialization connecting line Cli2 in the (2k−1)-th column connects a respective second reset signal line of the plurality of second reset signal lines (e.g., the respective second reset signal line of the present stage Vint2N) and the source electrode S6 of the sixth transistor T6 in the respective pixel driving circuit in the (2k−1)-th column together.

The relay electrode RE connects a source electrode S5 of the fifth transistor T5 in the respective pixel driving circuit to an anode contact pad in the respective pixel driving circuit, which in turn is connected to an anode in a respective subpixel.

Various appropriate conductive materials and various appropriate fabricating methods may be used to make the signal line layer. For example, a conductive material may be deposited on the substrate by a plasma-enhanced chemical vapor deposition (PECVD) process and patterned. Examples of appropriate conductive materials for making the first signal line layer include, but are not limited to, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. Optionally, the plurality of voltage supply lines Vdd, the plurality of third reset signal lines, the plurality of fourth reset signal lines, the node connecting line Cln, the first initialization connecting line Cli1, the second initialization connecting line Cli2, and the relay electrode RE are in a same layer.

Vias extending through at least one of the interlayer dielectric layer ILD, the insulating layer IN, and the gate insulating layer GI are depicted in FIG. 5F.

Vias extending through the first planarization layer PLN1 are depicted in FIG. 5G. In FIG. 5G, corresponding positions of the components of the first signal line layer are depicted in dotted lines.

Referring to Referring to FIG. 2A, FIG. 2B, FIG. 5A, and FIG. 5H, the second signal line layer in some embodiments includes a plurality of data line DL, a plurality of second voltage supply lines Vdd2, and an anode contact pad ACP. The anode contact pad ACP is electrically connected to a source electrode of the fifth transistor T5 in the respective pixel driving circuit through a relay electrode. The anode contact pad ACP is electrically connected to an anode in a respective subpixel. A respective one of the plurality of second voltage supply lines Vdd2 is electrically connected to a respective one of the plurality of first voltage supply lines Vdd through vias extending through the first planarization layer (see, e.g., FIG. 5G).

Vias extending through the second planarization layer PLN2 are depicted in FIG. 5I.

Referring to FIG. 2A, FIG. 2B, FIG. 5A, and FIG. 5J, the array substrate further includes an anode layer AD. A plurality of subpixel apertures SA respectively corresponding to a plurality of anodes are denoted in FIG. 5J. Vias extending through the second planarization layer PLN2 are depicted in FIG. 5J. A respective anode is connected to a respective anode contact pad through a respective via extending through the second planarization layer PLN2.

Referring to FIG. 2A, FIG. 2B, FIG. 5A, and FIG. 5K, the array substrate further includes a pixel definition layer PDL defining a plurality of subpixel apertures SA. In FIG. 5K, corresponding positions of the plurality of anodes are depicted in dotted lines.

Referring to FIG. 2A, FIG. 3B, FIG. 5A, FIG. 5E, and FIG. 6A, in some embodiments, an orthographic projection of the second capacitor electrode Ce2 on a base substrate BS completely covers, with a margin, an orthographic projection of the first capacitor electrode Ce1 on the base substrate BS except for a hole region H in which a portion of the second capacitor electrode Ce2 is absent. In some embodiments, the first signal line layer includes a node connecting line Cln on a side of the inter-layer dielectric layer ILD away from the second capacitor electrode Ce2. The node connecting line Cln is in a same layer as the plurality of voltage supply lines Vdd. Optionally, the array substrate further includes a first via v1 in the hole region H and extending through the inter-layer dielectric layer ILD and the insulating layer IN. Optionally, the node connecting line Cln is connected to the first capacitor electrode Ce1 through the first via v1. In some embodiments, the first capacitor electrode Ce1 is on a side of the gate insulating layer IN away from the base substrate BS. Optionally, the array substrate further includes a first via v1 and a second via v2. The first via v1 is in the hole region H and extends through the inter-layer dielectric layer ILD and the insulating layer IN. The second via v2 extends through the inter-layer dielectric layer ILD, the insulating layer IN, and the gate insulating layer GI. Optionally, the node connecting line Cln is connected to the first capacitor electrode Ce1 through the first via v1, and is connected node connecting line Cln is connected the semiconductor material layer SML through the second via v2. Optionally, the node connecting line Cln is connected to the source electrode S3 of third transistor, as depicted in FIG. 6A.

Referring to Referring to FIG. 2A, FIG. 3B, FIG. 5A, FIG. 5E, FIG. 5F, FIG. 6B, and FIG. 6E, in some embodiments, the interference preventing block IPB is in a same layer as the second capacitor electrode Ce2. The respective voltage supply line of the plurality of voltage supply lines Vdd is connected to the interference preventing block IPB through a third via v3. Optionally, the third via v3 extends through the inter-layer dielectric layer ILD. Optionally, an orthographic projection of the interference preventing block IPB on the base substrate BS partially overlaps with an orthographic projection of the respective voltage supply line of the plurality of voltage supply lines Vdd on the base substrate BS. Optionally, the orthographic projection of the interference preventing block IPB on the base substrate BS at least partially overlaps with an orthographic projection of an active layer ACT3 of the third transistor T3 on the base substrate BS.

FIG. 6B is a cross-sectional view along a B-B' line in FIG. 5A. Referring to FIG. 6B, FIG. 5A, and FIG. 5C to FIG. 5F, the respective third reset signal line VintA in the (2k−1)-th column connects a respective first reset signal line of the plurality of first reset signal lines (e.g., the respective first reset signal line of the present stage Vint1N) and the source electrode S1 of the first transistor T1 in a respective pixel driving circuit in the (2k−1)-th column together. The respective first reset signal line of the plurality of first reset signal lines (e.g., the respective first reset signal line of the present stage Vint1N) is configured to provide a reset signal to the source electrode S1 of the first transistor T1 in the respective pixel driving circuit in the (2k−1)-th column, through the respective third reset signal line VintA in the (2k−1)-th column. Optionally, the respective third reset signal line VintA in the (2k−1)-th column is connected to the respective first reset signal line of the present stage Vint1N through a fourth via v4 extending through the inter-layer dielectric layer ILD. Optionally, the respective third reset signal line VintA in the (2k−1)-th column is connected to the source electrode S1 of the first transistor T1 in the respective pixel driving circuit in the (2k−1)-th column through a fifth via v5 extending through the inter-layer dielectric layer ILD, the insulating layer IN, and the gate insulating layer GI.

FIG. 6C is a cross-sectional view along a C-C' line in FIG. 5A. Referring to FIG. 6C, FIG. 5A, and FIG. 5C to FIG. 5F, the second initialization connecting line Cli2 in the (2k−1)-th column connects a respective second reset signal line of the plurality of second reset signal lines (e.g., the respective second reset signal line of the present stage Vint2N) and the source electrode S6 of the sixth transistor T6 in the respective pixel driving circuit in the (2k−1)-th column together. The respective second reset signal line of the plurality of second reset signal lines (e.g., the respective second reset signal line of the present stage Vint2N) is configured to provide a reset signal to the source electrode S6 of the sixth transistor T6 in the respective pixel driving circuit in the (2k−1)-th column, through the second initialization connecting line Cli2 in the (2k−1)-th column. Optionally, the second initialization connecting line Cli2 is connected to the respective second reset signal line of the present stage Vint2N through a sixth via v6 extending through the inter-layer dielectric layer ILD. Optionally, the second initialization connecting line Cli2 is connected to the source electrode S6 of the sixth transistor T6 in the respective pixel driving circuit in the (2k−1)-th column through a seventh via v7 extending through the inter-layer dielectric layer ILD, the insulating layer IN, and the gate insulating layer GI.

FIG. 6D is a cross-sectional view along a D-D' line in FIG. 5A. Referring to FIG. 6D, FIG. 5A, and FIG. 5C to FIG. 5F, the first initialization connecting line Cli1 in the (2k)-th column connects a respective first reset signal line of the plurality of first reset signal lines (e.g., the respective first reset signal line of the present stage Vint1N) and the source electrode S1 of the first transistor T1 in a respective pixel driving circuit in the (2k)-th column together. The respective first reset signal line of the plurality of first reset signal lines (e.g., the respective first reset signal line of the present stage Vint1N) is configured to provide a reset signal to the source electrode S1 of the first transistor T1 in the respective pixel driving circuit in the (2k)-th column, through the first initialization connecting line Cli1 in the (2k)-th column. Optionally, the first initialization connecting line Cli1 in the (2k)-th column is connected to the respective first reset signal line of the present stage Vint1N through an eighth via v8 extending through the inter-layer dielectric layer ILD. Optionally, the first initialization connecting line Cli1 in the (2k)-th column is connected to the source electrode S1 of the first transistor T1 in the respective pixel driving circuit in the (2k)-th column through a ninth via v9 extending through the inter-layer dielectric layer ILD, the insulating layer IN, and the gate insulating layer GI.

FIG. 6E is a cross-sectional view along a E-E' line in FIG. 5A. Referring to FIG. 6E, FIG. 5A, and FIG. 5C to FIG. 5F, the respective fourth reset signal line VintB in the (2k)-th column connects a respective second reset signal line of the plurality of second reset signal lines (e.g., the respective second reset signal line of the present stage Vint2N) and the source electrode S6 of the sixth transistor T6 in the respective pixel driving circuit in the (2k)-th column together. The respective second reset signal line of the plurality of second reset signal lines (e.g., the respective second reset signal line of the present stage Vint2N) is configured to provide a reset signal to the source electrode S6 of the sixth transistor T6 in the respective pixel driving circuit in the (2k)-th column, through the respective fourth reset signal line VintB in the (2k)-th column. Optionally, the respective fourth reset signal line VintB in the (2k)-th column is connected to the respective second reset signal line of the present stage Vint2N through a tenth via v10 extending through the inter-layer dielectric layer ILD. Optionally, the respective fourth reset signal line VintB in the (2k)-th column is connected to the source electrode S6 of the sixth transistor T6 in the respective pixel driving circuit in the (2k)-th column through an eleventh via v11 extending through the inter-layer dielectric layer ILD, the insulating layer IN, and the gate insulating layer GI.

Referring to FIG. 5A, FIG. 5D, FIG. 6A, FIG. 6B, and FIG. 6D, in a respective pixel driving circuit, a respective gate line of the plurality of gate lines GL in some embodiments includes a main portion MP extending along an extension direction of the respective gate line, and a gate protrusion GP protruding away from the main portion MP, e.g., along a direction from the respective gate line of the plurality of gate lines GL in a present stage toward the respective reset control signal line rstN in the present stage.

In some embodiments, as discussed above, the third transistor T3 is a double gate transistor. In some embodiments, the gate protrusion GP is one of the double gates in the third transistor T3. In some embodiments, and referring to FIG. 6A, an orthographic projection of the gate protrusion GP on the base substrate BS at least partially overlaps with an orthographic projection of the active layer ACT3 of the third transistor T3 on the base substrate BS.

In some embodiments, in a respective column of pixel driving circuit, a total number of pixel driving circuits (or a total number of subpixels) is P. At least in one respective column of pixel driving circuits, a ratio of a total number of reset signal lines extending along the second direction DR2 and through the P number of pixel driving circuits to a total number of initialization connecting lines is 1:P. Referring to FIG. 5A, FIG. 5B, and FIG. 5F, in a (2k−1)-th column C(2k−1), a total number of pixel driving circuits (or a total number of subpixels) is P. In the (2k−1)-th column C(2k−1), ratio of a total number of third reset signal lines to a total number of second initialization connecting lines Cli2 is 1:P; a ration of a total number of third reset signal lines to a total number of first initialization connecting lines Cli1 is 1:0. In a (2k)-th column C(2k), a total number of pixel driving circuits (or a total number of subpixels) is P. In the (2k)-th column C(2k), a ratio of a total number of fourth reset signal lines to a total number of first initialization connecting lines Cli1 is 1:P; a ratio of a total number of fourth reset signal lines to a total number of second initialization connecting lines Cli2 is 1:0. As used herein, in the context of “a ratio of a total number of reset signal lines extending along the second direction DR2 and through the P number of pixel driving circuits to a total number of initialization connecting lines is 1:P”, the term “P number of pixel driving circuits” refers to pixel driving circuits that are configured to drive light emission of light emitting elements. For example, the array substrate may include dummy subpixels, which may include “dummy” pixel driving circuits that are not able to drive light emission in the dummy subpixels. In these dummy subpixels, initialization connecting lines may not be present. Thus, when the array substrate includes p number of dummy subpixels and (P−p) number of light emitting subpixels, a ratio of a total number of reset signal lines extending along the second direction DR2 and through (P−p) number of pixel driving circuits and p number of “dummy” pixel driving circuits to a total number of initialization connecting lines is 1:(P−p).

The inventors of the present disclosure discover that, a parasitic capacitance between a reset signal line and the third node N3 can increase the minimum charging time for charging the driving transistor T3 (e.g., by charging the N1 node). The inventors of the present disclosure discover that, surprisingly and unexpectedly, minimizing the parasitic capacitance between the reset signal line and the third node N3 can decrease the minimum charging time for charging the driving transistor T3, achieving faster response and enhancing image display quality.

Figure 7A:
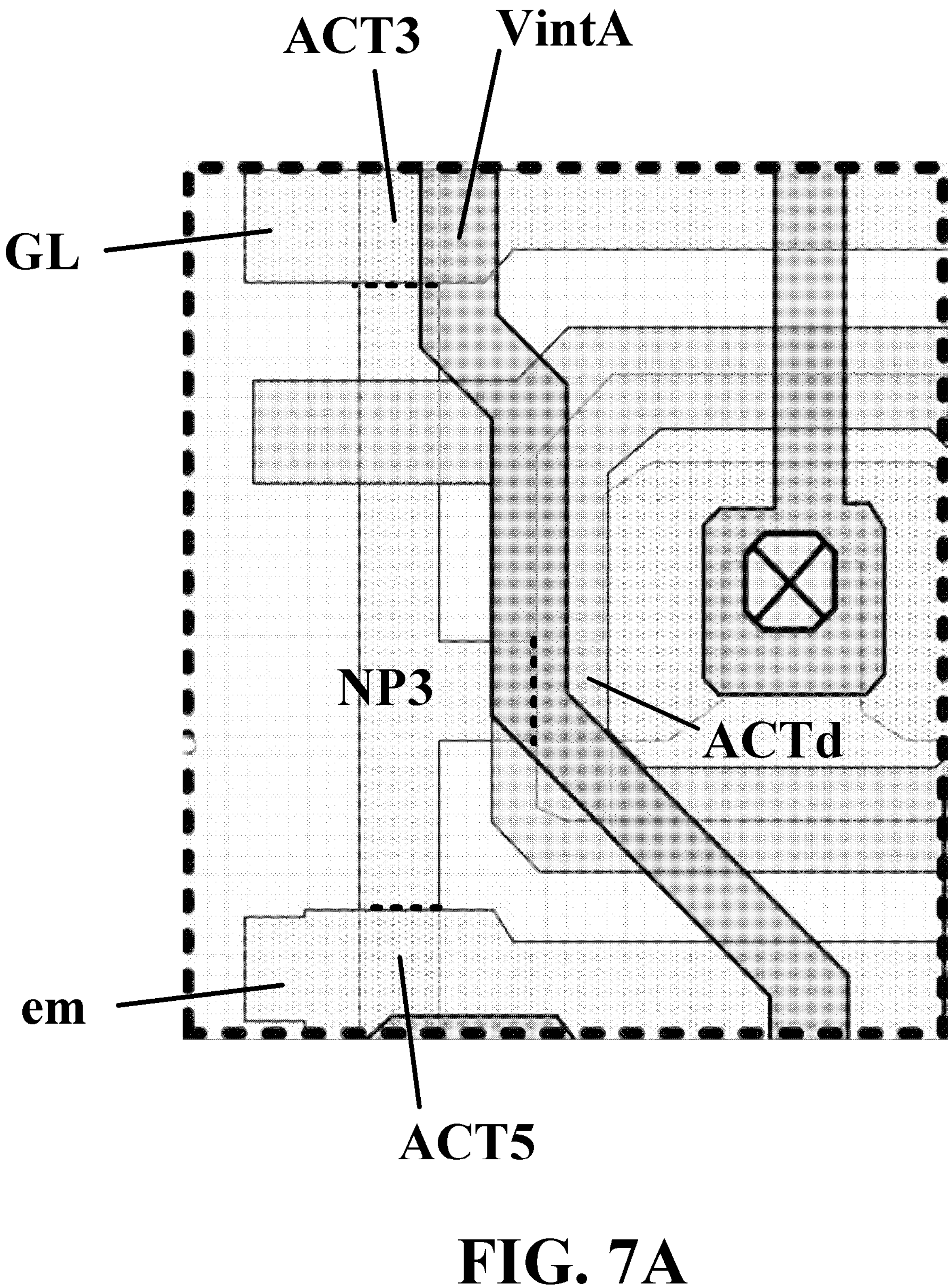
FIG. 7A is a zoom-in view of a first zoom-in region ZR1 in FIG. 3A.
Figure 7B:
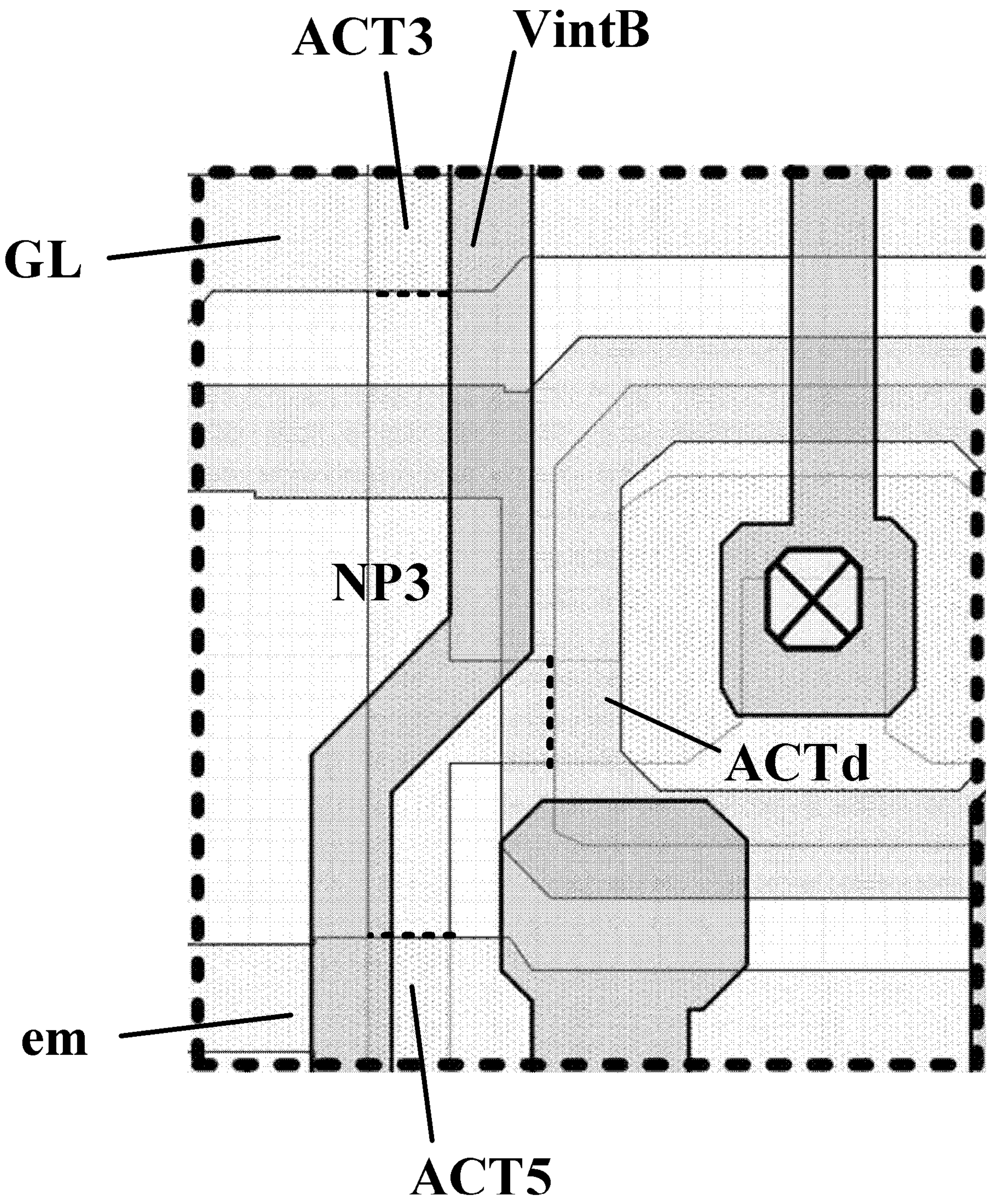
FIG. 7B is a zoom-in view of a second zoom-in region ZR2 in FIG. 3A.

FIG. 7A is a zoom-in view of a first zoom-in region ZR1 in FIG. 3A. FIG. 7B is a zoom-in view of a second zoom-in region ZR2 in FIG. 3A. Referring to FIG. 3A, FIG. 5C, FIG. 6A, FIG. 7A, and FIG. 7B, in a respective pixel driving circuit, the semiconductor material layer SML includes an active layer ACT3 of a third transistor T3, an active layer ACT5 of a fifth transistor T5, an active layer ACTd of a driving transistor Td, a third node portion NP3 that is connected to the active layer ACT3 of the third transistor T3, the active layer ACT5 of the fifth transistor T5, and the active layer ACTd of the driving transistor Td in the respective pixel driving circuit. Referring to FIG. 2A, FIG. 2B, FIG. 3A, FIG. 5C, FIG. 6A, FIG. 7A, and FIG. 7B, the third node portion NP3 is a portion of the semiconductor material layer having the third node N3.

In one example, boundaries of the third node portion NP3 are defined by respective boundaries of adjacent active layers. In another example, boundaries of adjacent active layers are in turn defined by orthographic projections of respective gate electrodes on the semiconductor material layer SML. For example, boundaries of the active layer ACT3 of the third transistor T3 are defined by an orthographic projection the respective gate line on the semiconductor material layer SML; boundaries of the active layer ACT5 of the fifth transistor T5 are defined by an orthographic projection of the respective light emitting control signal line on the semiconductor material layer SML; and boundaries of the active layer ACTd of the driving transistor Td are defined by an orthographic projection of the first capacitor electrode Ce1 (functioning as a gate electrode of the driving transistor Td) on the semiconductor material layer SML. Accordingly, in some embodiments, the boundaries of the third node portion NP3 are defined an adjacent boundary of the active layer ACT3 of the third transistor T3, an adjacent boundary of the active layer ACT5 of the fifth transistor T5, and an adjacent boundary of the active layer ACTd of the driving transistor Td.

Accordingly, the reset signal line in the present disclosure has a unique structure to minimize or avoid overlapping with the third node N3. The intricate line patterns of the reset signal lines in the present disclosure reduce overlapping between the reset signal line and the third node portion NP3, thereby reducing the parasitic capacitance between the reset signal line and the third node N3.

In some embodiments, at least 30% (e.g., at least 35%, at least 40%, at least 45%, at least 50%, at least 55%, at least 60%, at least 65%, at least 70%, at least 75%, at least 80%, at least 85%, at least 90%, at least 95%, at least 99%, or 100%) of an orthographic projection of the third node portion on the base substrate is non-overlapping with an orthographic projection of a reset signal line (e.g., a respective third reset signal line or a respective fourth reset signal line) on the base substrate. Optionally, at least 80% of the orthographic projection of the third node portion on the base substrate is non-overlapping with the orthographic projection of the reset signal line on the base substrate.

In some embodiments, the third node portion NP3 includes contiguously a first part and a second part. The first part connects the active layer ACT3 of the third transistor T3 to the active layer ACT5 of the fifth transistor T5, the first part extending along the second direction DR2. The second part connects the first part to the active layer ACTd of the driving transistor Td, the second part extending along the first direction DR1.

Referring to FIG. 3A and FIG. 7A, in a (2k−1)-th column, a portion of the respective third reset signal line VintA (e.g., the first non-colinear segment NCL1 as depicted in FIG. 4B) crosses over the second part of the third node portion NP3 in the (2k−1)-th column. An orthographic projection of the first non-colinear segment NCL1 on the base substrate partially overlaps with an orthographic projection of the active layer ACTd of the driving transistor Td on the base substrate.

Referring to FIG. 3A and FIG. 7B, in a (2k)-th column, a portion of the respective fourth reset signal line VintB (e.g., the second non-colinear segment NCL2 as depicted in FIG.

4B) crosses over the first part of the third node portion NP3 in the (2k)-th column. An orthographic projection of the second non-colinear segment NCL2 on the base substrate is non-overlapping with an orthographic projection of the active layer ACTd of the driving transistor Td on the base substrate. Optionally, the orthographic projection of the second non-colinear segment NCL2 on the base substrate is non-overlapping with an orthographic projection of a channel part of the active layer ACTd of the driving transistor Td on the base substrate.

The inventors of the present disclosure further discover that, overlapping between the reset signal lines (e.g., VintA and VintB) and the plurality of gate lines GL increases loading in the plurality of gate lines GL. Reducing the overlapping area between the reset signal lines and the plurality of gate lines GL can effectively reduce loading in the plurality of gate lines GL, achieving faster response and enhancing image display quality.

As discussed above, and referring to FIG. 5A, FIG. 5D, FIG. 6A, FIG. 6B, and FIG. 6D, in a respective pixel driving circuit, a respective gate line of the plurality of gate lines GL in some embodiments includes a main portion MP extending along an extension direction of the respective gate line, and a gate protrusion GP protruding away from the main portion MP, e.g., along a direction from the respective gate line of the plurality of gate lines GL in a present stage toward the respective reset control signal line rstN in the present stage.

To reducing loading in the plurality of gate lines GL, in some embodiments, at least 70% (e.g., at least 70%, at least 80%, at least 85%, at least 90%, at least 95%, at least 98%, at least 99%, or 100%) of the orthographic projection of the gate protrusion GP on the base substrate BS is non-overlapping with an orthographic projection of a reset signal line (e.g., VintA or VintB) on the base substrate. Optionally, the orthographic projection of the gate protrusion GP on the base substrate is non-overlapping with the orthographic projection of the reset signal line on the base substrate.

Figure 7C:
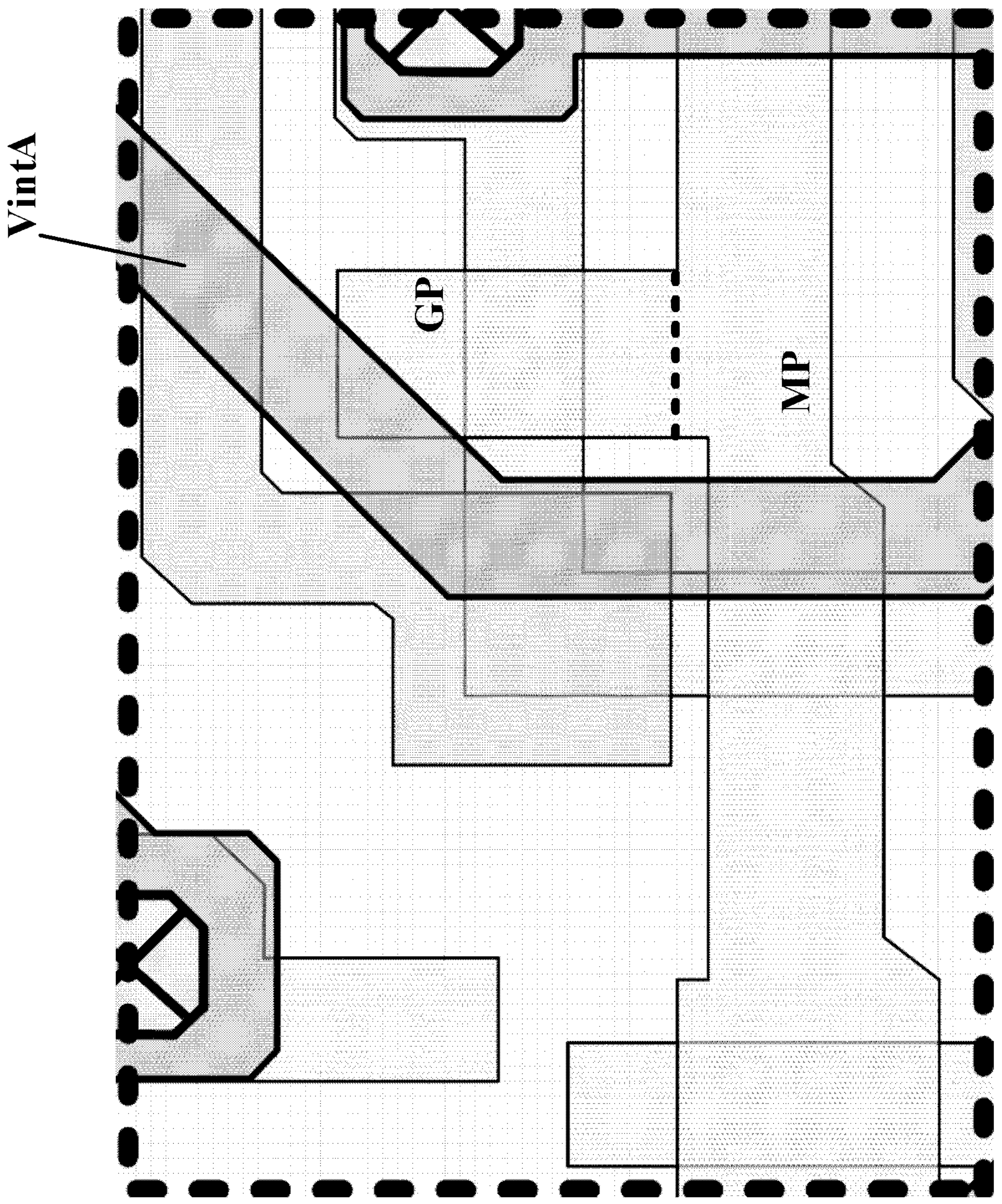
FIG. 7C is a zoom-in view of a third zoom-in region ZR3 in FIG. 3A.

FIG. 7C is a zoom-in view of a third zoom-in region ZR3 in FIG. 3A. Referring to FIG. 7C, at least 75% of the orthographic projection of the gate protrusion GP on the base substrate is non-overlapping with an orthographic projection of the respective third reset signal line VintA.

Figure 7D:
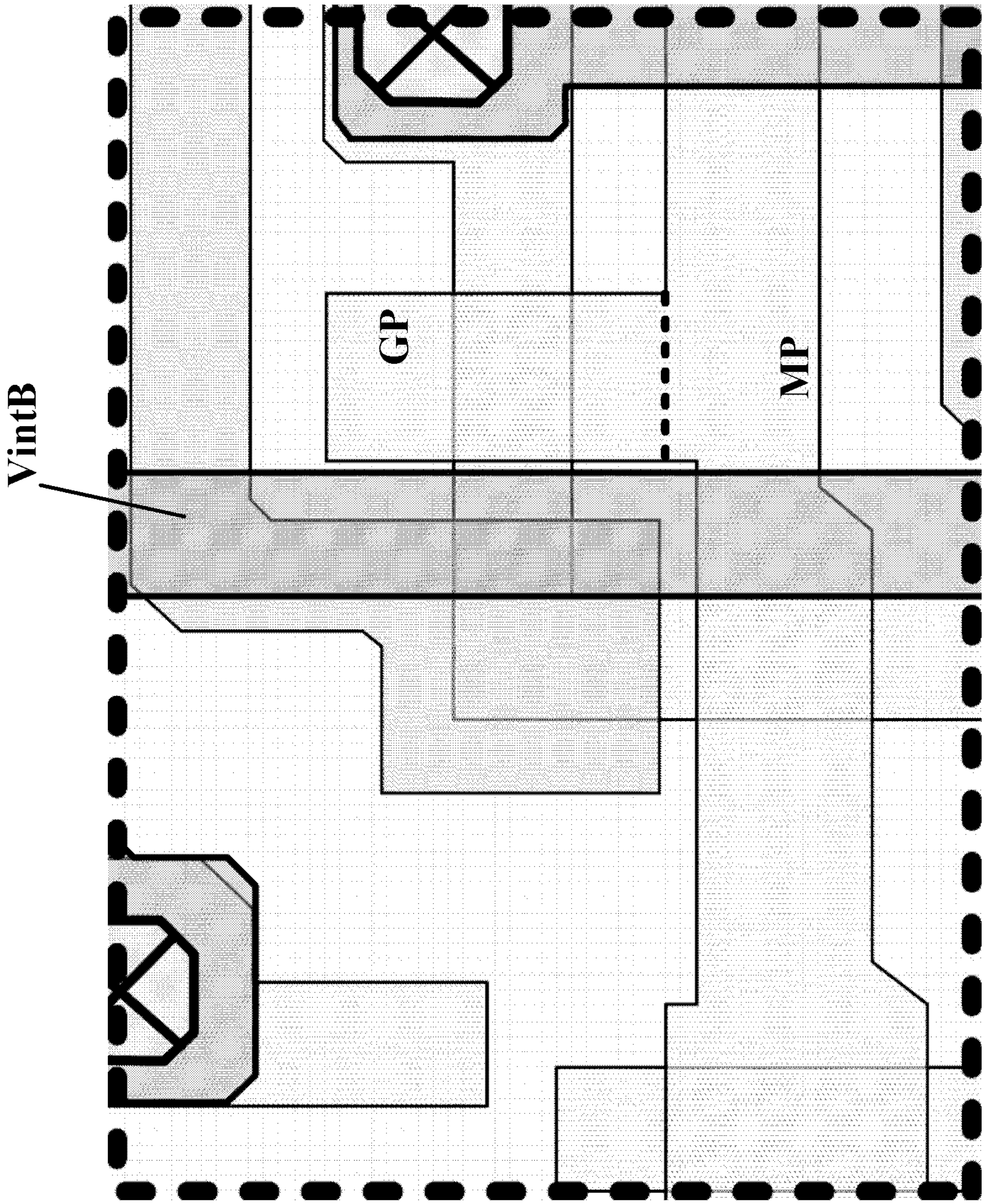
FIG. 7D is a zoom-in view of a fourth zoom-in region ZR4 in FIG. 3A.

FIG. 7D is a zoom-in view of a fourth zoom-in region ZR4 in FIG. 3A. Referring to FIG. 7D, the orthographic projection of the gate protrusion GP on the base substrate BS is non-overlapping with the orthographic projection of the respective fourth reset signal line on the base substrate.

The inventors of the present disclosure further discover that a degree of unevenness of anodes in an array substrate or a display panel could adversely affect image display. For example, color shift may result from the anodes being tilted. It is discovered in the present disclosure that signal lines underneath the anodes could significantly affect the degree the anodes being titled. In one example, underneath an anode, at one side a signal line is disposed while the other side is absent of a signal line. This results in an uneven surface of a planarization layer on top of the signal line. The uneven surface of the planarization layer in turn results in the anode on top of the planarization layer being tilted. The titled anode reflects more light toward one side of the array substrate or the display panel. In the array substrate or the display panel, titled anodes associated with subpixels of different colors have different titled angles, thus light reflected by anodes in subpixels of different colors reflect light of different colors respectively at different angles. The accumulated effect of this issue lead to color shift at a large viewing angle.

Figure 8:
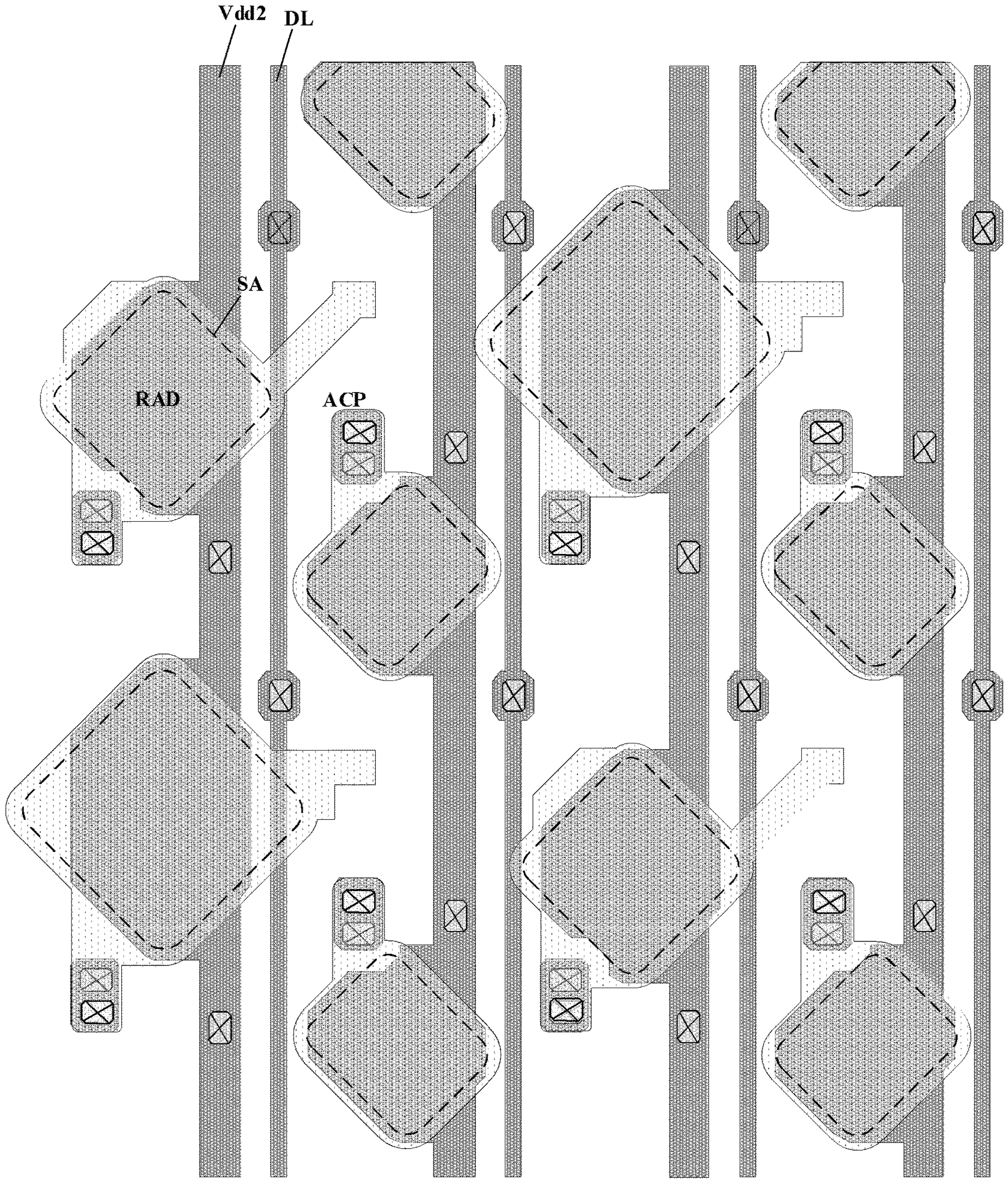
FIG. 8 is a diagram illustrating the structure of a second signal line layer and an anode layer in an array substrate depicted in FIG. 5A.

Accordingly, the present array substrate adopts an intricate structure of anodes and signal lines to achieve an even surface of the planarization layer underneath the anodes. As a result, color shift issue can be alleviated. FIG. 8 is a diagram illustrating the structure of a second signal line layer and an anode layer in an array substrate depicted in FIG. 5A. Referring to FIG. 8, in some embodiments, at least 60% (e.g., at least 65%, at least 70%, at least 75%, at least 80%, at least 85%, or at least 90%) of an orthographic projection of a respective anode RAD on the base substrate overlaps with an orthographic projection of a respective second voltage supply line of the plurality of second voltage supply lines Vdd2 on the base substrate. Optionally, referring to FIG. 5A and FIG. 8, an orthographic projection of at least one anode on the base substrate overlaps with an orthographic projection of a respective second voltage supply line on the base substrate and an orthographic projection of a respective third reset signal line VintA on the base substrate.

Referring to FIG. 5H, the respective second voltage supply line in some embodiments includes an anode support part ASP and a main signal line part MSLP. The main signal line part MSLP extends along the second direction DR2, and have a substantially the same (e.g., with less than 30% variation, with less than 25% variation, with less than 20% variation, with less than 15% variation, with less than 10% variation, or with less than 5% variation) width along the first direction DR1. The anode support part ASP protrudes away from the main signal line part MSLP. Referring to FIG. 5H and FIG. 8, in some embodiments, at least 70% (e.g., at least 75%, at least 80%, at least 85%, at least 90%, at least 95%, or at least 99%) of an orthographic projection of the anode support part ASP on the base substrate overlaps with the orthographic projection of the respective anode RAD on the base substrate.

In some embodiments, at least one anode includes a main anode part and one or more extension extending away from the main anode part. An orthographic projection of at least one extension on the base substrate at least partially overlaps with an orthographic projection of an active layer of a third transistor on the base substrate. Optionally, the orthographic projection of an extension of at least one anode on the base substrate covers an orthographic projection of an active layer of a third transistor on the base substrate.

Figure 9:
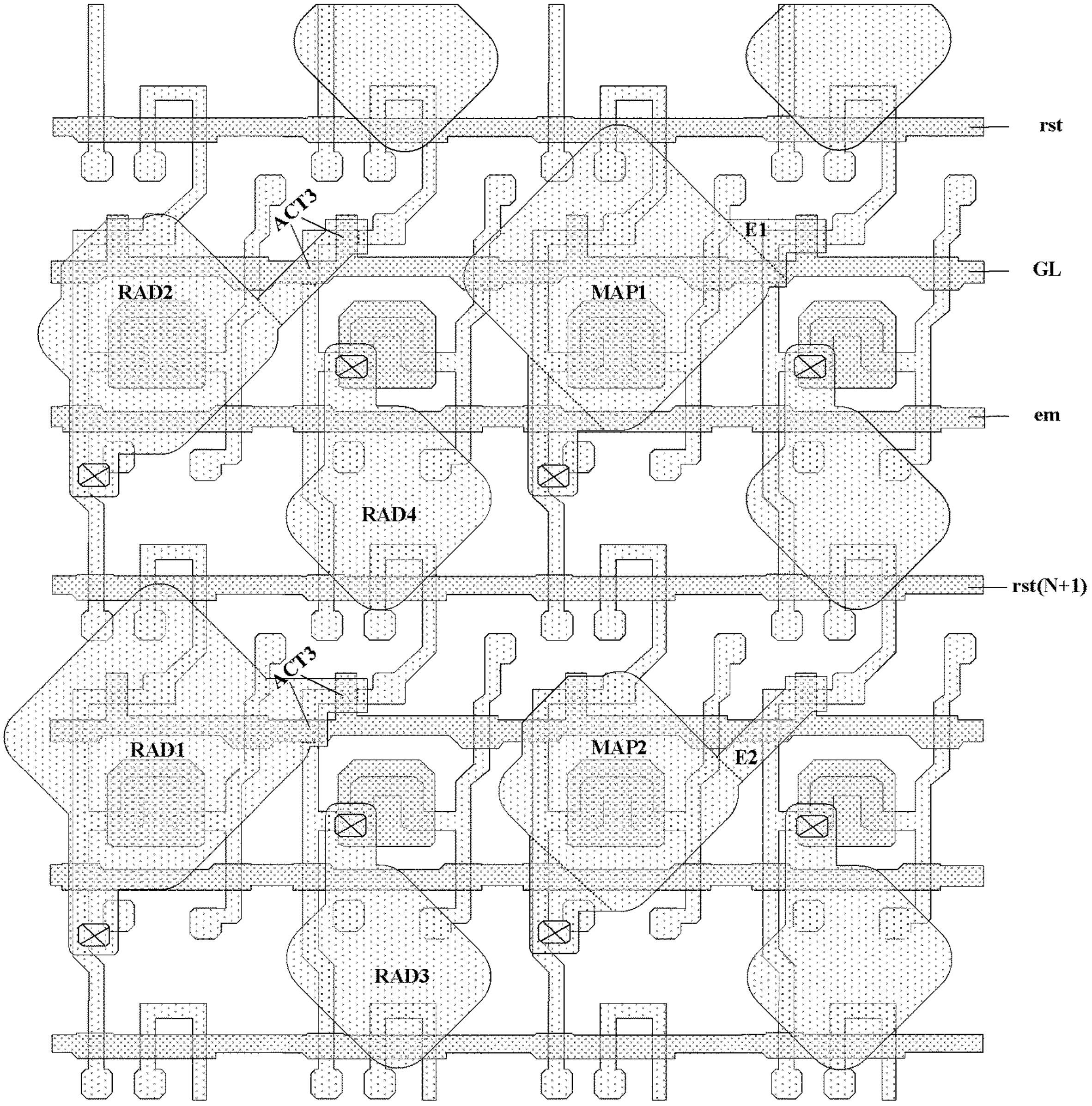
FIG. 9 is a diagram illustrating the structure of a semiconductor material layer, a first conductive layer, and an anode layer in an array substrate depicted in FIG. 5A.

FIG. 9 is a diagram illustrating the structure of a semiconductor material layer, a first conductive layer, and an anode layer in an array substrate depicted in FIG. 5A. Referring to FIG. 9, the anode layer in some embodiments includes a first respective anode RAD1, a second respective anode RAD2, a third respective anode RAD3, and a fourth respective anode RAD4. In one example, the first respective anode RAD1 is an anode for a red subpixel, the second respective anode RAD2 is an anode for a blue subpixel, and the third respective anode RAD3 and the fourth respective anode RAD4 are anodes for two green subpixels. In some embodiments, an array of the plurality of subpixels in the array substrate includes a R-G-B-G format repeating array, in which R stands for the red subpixel, B stands for the blue subpixel, and G stands for the green subpixel.

In one example, in a (2k−1)-th column of pixel driving circuits, the pixel driving circuits are configured to be connected to red subpixels or blue subpixels; in a (2k)-th column of pixel driving circuits, the pixel driving circuits are configured to be connected to green subpixels.

In another example, in a (2k−1)-th column of pixel driving circuits, the pixel driving circuits are configured to be connected to green subpixels; in a (2k)-th column of pixel driving circuits, the pixel driving circuits are configured to be connected to red subpixels or blue subpixels.

In one example, the first respective anode RAD1 includes a first main anode part MAP1 and a first extension E1 extending away from the first main anode part MAP1. An orthographic projection of the first extension E1 on the base substrate at least partially overlaps with an orthographic projection of an active layer ACT3 of a third transistor on the base substrate. Optionally, the orthographic projection of the first extension E1 on the base substrate at least partially overlaps with an orthographic projection of a gate protrusion GP of a respective gate line. The first extension E1 protects the active layer ACT3 from light irradiation.

In another example, the second respective anode RAD2 includes a second main anode part MAP2 and a second extension E2 extending away from the second main anode part MAP2. An orthographic projection of the second extension E2 on the base substrate at least partially overlaps with an orthographic projection of an active layer ACT3 of a third transistor on the base substrate. Optionally, the orthographic projection of the second extension E2 on the base substrate covers the orthographic projection of the active layer ACT3 of a third transistor on the base substrate. Optionally, the orthographic projection of the second extension E2 on the base substrate at least partially overlaps with an orthographic projection of a gate protrusion GP of a respective gate line. The second extension E2 protects the active layer ACT3 from light irradiation.

Figure 10:
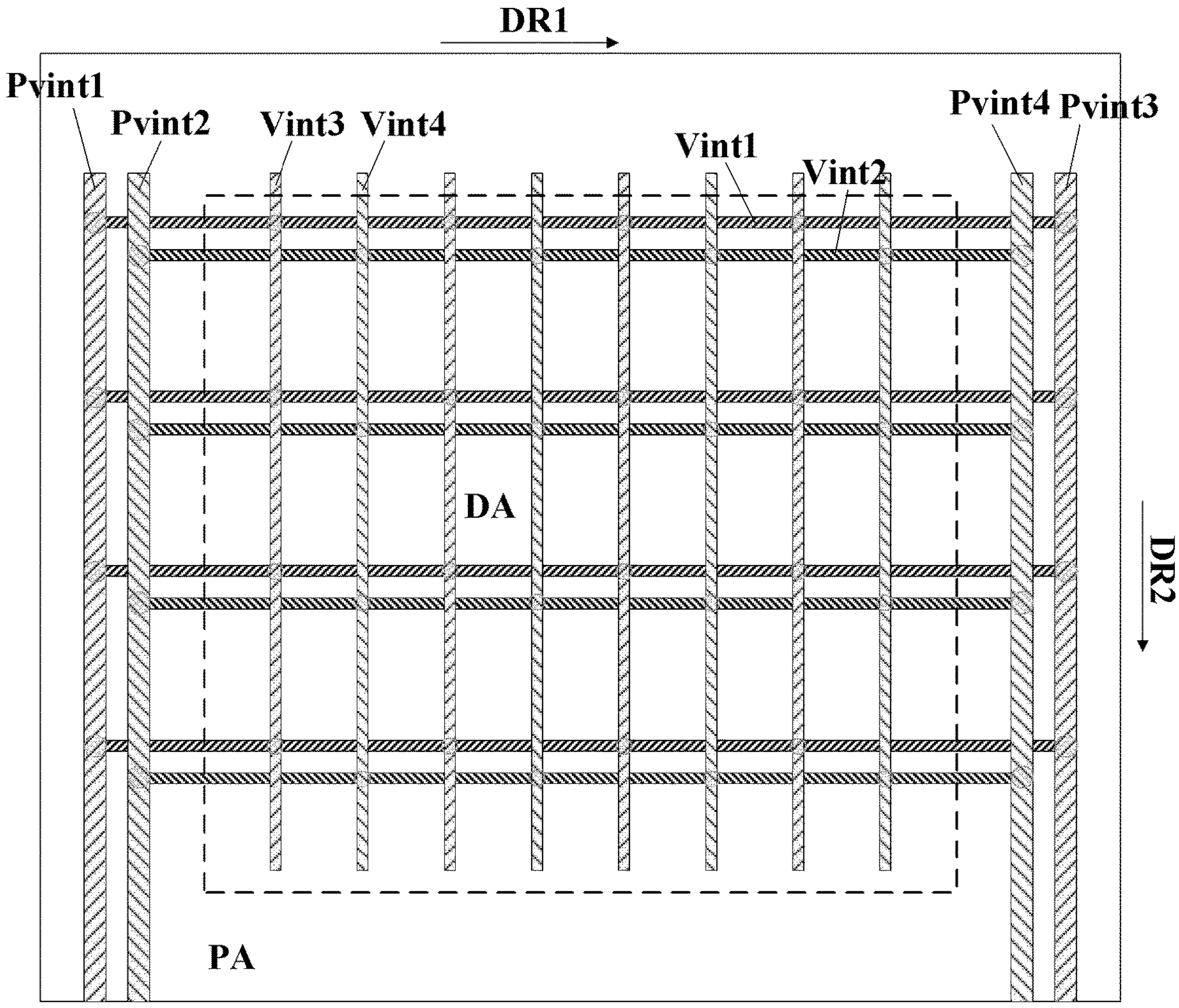
FIG. 10 is a schematic diagram illustrating layout of reset signal lines in an array substrate in some embodiments according to the present disclosure.

FIG. 10 is a schematic diagram illustrating layout of reset signal lines in an array substrate in some embodiments according to the present disclosure. Referring to FIG. 10, the array substrate includes a reset signal supply network. The reset signal supply network includes a first interconnected reset signal supply network and a second interconnected reset signal supply network. The array substrate includes a display area DA and a peripheral area PA. In the display area DA, the first interconnected reset signal supply network includes a plurality of first reset signal lines Vint1 respectively extending along the first direction DR1 and a plurality of third reset signal lines Vint3 respectively extending along the second direction DR2; the second interconnected reset signal supply network includes a plurality of second reset signal lines Vint2 respectively extending along the first direction DR1 and a plurality of fourth reset signal lines Vint4 respectively extending along the second direction DR2. In the peripheral area PA, the array substrate further includes a first peripheral reset signal supply line Pvint1 and a second peripheral reset signal supply line Pvint2. Optionally, the first peripheral reset signal supply line Pvint1 and the second peripheral reset signal supply line Pvint2 extend along the second direction DR2, respectively. The first peripheral reset signal supply line Pvint1 is connected to the plurality of first reset signal lines Vint1; and the second peripheral reset signal supply line Pvint2 is connected to the plurality of second reset signal lines Vint2. Optionally, in the peripheral area PA, the array substrate further includes a third peripheral reset signal supply line Pvint3 and a fourth peripheral reset signal supply line Pvint4. The third peripheral reset signal supply line Pvint3 is connected to the plurality of first reset signal lines Vint1; and the fourth peripheral reset signal supply line Pvint4 is connected to the plurality of second reset signal lines Vint2.

In another aspect, the present invention provides a display apparatus, including the array substrate described herein or fabricated by a method described herein, and one or more integrated circuits connected to the array substrate. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a micro light emitting diode display apparatus. Optionally, the display apparatus is a mini light emitting diode display apparatus.

In another aspect, the present disclosure provides a method of fabricating an array substrate. In some embodiments, the method includes forming K number of reset signal lines respectively configured to provide reset signals to reset transistors in K columns pixel driving circuits of the array substrate. Optionally, forming the K number of reset signal lines includes forming a plurality of third reset signal lines in (2k−1)-th columns of K columns, K and k being positive integers, $1 \leq k \leq (K/2)$; and forming a plurality of fourth reset signal lines in (2k)-th columns of the K columns. Optionally, a respective third reset signal line and a respective fourth reset signal line are formed to have different line patterns.

In some embodiments, the method includes forming a first interconnected reset signal supply network and forming a second interconnected reset signal supply network. Optionally, forming the first interconnected reset signal supply network includes forming the plurality of third reset signal lines in the (2k−1)-th columns, and forming a plurality of first reset signal lines respectively cross over the plurality of third reset signal lines. Optionally, forming the second interconnected reset signal supply network includes forming the plurality of fourth reset signal lines in the (2k)-th columns, and forming a plurality of second reset signal lines respectively cross over the plurality of fourth reset signal lines.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An array substrate, comprising:

K number of reset signal lines respectively configured to provide reset signals to reset transistors in K columns pixel driving circuits of the array substrate;

wherein the K number of reset signal lines comprises:

a plurality of third reset signal lines in (2k−1)-th columns of K columns, K and k being positive integers, 1≤ k≤ (K/2); and a plurality of fourth reset signal lines in (2k)-th columns of the K columns;

wherein the array substrate comprises a first interconnected reset signal supply network and a second interconnected reset signal supply network;

wherein the first interconnected reset signal supply network comprises the plurality of third reset signal lines in the (2k−1)-th columns, and a plurality of first reset signal lines respectively cross over the plurality of third reset signal lines; and the second interconnected reset signal supply network comprises the plurality of fourth reset signal lines in the (2k)-th columns, and a plurality of second reset signal lines respectively cross over the plurality of fourth reset signal lines;

wherein the array substrate further comprises a first initialization connecting line present in a (2k)-th column, and absent in a (2k−1)-th column and a second initialization connecting line present in the (2k−1)-th column, and absent in the (2k)-th column;

wherein the first initialization connecting line in the (2k)-th column connects a respective first reset signal line of the plurality of first reset signal lines and a source electrode of a first reset transistor in a respective pixel driving circuit in the (2k)-th column together;

the second initialization connecting line in the (2k−1)-th column connects a respective second reset signal line of the plurality of second reset signal lines and a source electrode of a second reset transistor in a respective pixel driving circuit in the (2k−1)-th column together;

a respective third reset signal line in the (2k−1)-th column connects a respective first reset signal line of the plurality of first reset signal lines and a source electrode of a first reset transistor in the respective pixel driving circuit in the (2k−1)-th column together; and a respective fourth reset signal line in the (2k)-th column connects a respective second reset signal line of the plurality of second reset signal lines and a source electrode of a second reset transistor in the respective pixel driving circuit in the (2k)-th column together.

2. The array substrate of claim 1, wherein a respective first reset signal line is connected to one or more of the plurality of third reset signal lines;

a respective third reset signal line is connected to one or more of the plurality of first reset signal lines;

a respective second reset signal line is connected to one or more of the plurality of fourth reset signal lines; and a respective fourth reset signal line is connected to one or more of the plurality of second reset signal lines.

3. The array substrate of claim 1, wherein the plurality of first reset signal lines and the plurality of second reset signal lines extend along a first direction, respectively;

the plurality of third reset signal lines and the plurality of fourth reset signal lines extend along a second direction, respectively; and the plurality of first reset signal lines and the plurality of second reset signal lines are alternately arranged along the second direction.

4. The array substrate of claim 1, wherein the plurality of third reset signal lines are substantially parallel to each other;

the plurality of fourth reset signal lines are substantially parallel to each other; and a respective third reset signal line is non-parallel to a respective fourth reset signal line.

5. The array substrate of claim 1, wherein a segment of a respective third reset signal line between two adjacent first reset signal lines and a segment of a respective fourth reset signal line between the two adjacent first reset signal lines are non-parallel to each other; or a segment of a respective third reset signal line between two adjacent second reset signal lines and a segment of a respective fourth reset signal line between the two adjacent second reset signal lines are non-parallel to each other.

6. The array substrate of claim 1, wherein a respective third reset signal line comprises a first colinear segment, a second colinear segment, and a first non-colinear segment connecting the first colinear segment to the second colinear segment; and a respective fourth reset signal line comprises a third colinear segment, a fourth colinear segment, and a second non-colinear segment connecting the third colinear segment to the fourth colinear segment.

7. The array substrate of claim 6, wherein a first distance between connecting points of the first non-colinear segment with the first colinear segment and the second colinear segment is different from a second distance between connecting points of the second non-colinear segment with the third colinear segment and the fourth colinear segment.

8. The array substrate of claim 6, to wherein the first non-colinear segment deviates from a virtual line connecting the first colinear segment and the second colinear segment by a first maximum distance;

the second non-colinear segment deviates from a virtual line connecting the third colinear segment and the fourth colinear segment by a second maximum distance; and the first maximum distance is different from the second maximum distance.

9. The array substrate of claim 8, wherein the first non-colinear segment deviates from the virtual line connecting the first colinear segment and the second colinear segment, and the second non-colinear segment deviates from the virtual line connecting the third colinear segment and the fourth colinear segment, toward a same side of the array substrate.

10. The array substrate of claim 1, wherein at least in one respective column of pixel driving circuit of the K columns of pixel driving circuits, a total number of pixel driving circuits is P;

in the respective column, a ratio of a total number of reset signal lines extending along a second direction and through P number of pixel driving circuits to a total number of initialization connecting lines is 1:P.

11. The array substrate of claim 1, further comprising:

a plurality of second voltage supply lines on a side of the plurality of third reset signal lines away from a base substrate; and a plurality of anodes on a side of the plurality of second voltage supply lines away from the base substrate;

wherein an orthographic projection of at least one anode on the base substrate overlaps with an orthographic projection of a respective second voltage supply line on the base substrate and an orthographic projection of a respective third reset signal line on the base substrate.

12. A display apparatus, comprising the array substrate of claim 1, and an integrated circuit connected to the array substrate.

13. An array substrate, comprising:

K number of reset signal lines respectively configured to provide reset signals to reset transistors in K columns pixel driving circuits of the array substrate;

wherein the K number of reset signal lines comprises:

a plurality of third reset signal lines in (2k−1)-th columns of K columns, K and k being positive integers, 1≤k≤(K/2); and a plurality of fourth reset signal lines in (2k)-th columns of the K columns;

wherein the array substrate comprises a semiconductor material layer;

wherein, in a respective subpixel, the semiconductor material layer comprises an active layer of a third transistor, an active layer of a fifth transistor, an active layer of a driving transistor, and a third node portion that is connected to the active layer of the third transistor, the active layer of the fifth transistor, and the active layer of the driving transistor in the respective subpixel; and at least 50% of an orthographic projection of the third node portion on a base substrate is non-overlapping with an orthographic projection of a respective third reset signal line or a respective fourth reset signal line on the base substrate.

14. The array substrate of claim 13, wherein the third node portion comprises a first part connecting the active layer of the third transistor to the active layer of the fifth transistor, the first part extending along a second direction; and a second part connecting the first part to the active layer of the driving transistor, the second part extending along a first direction.

15. The array substrate of claim 14, wherein, in a (2k−1)-th column, a first non-colinear segment of the respective third reset signal line crosses over the second part of the third node portion in the (2k−1)-th column; or an orthographic projection of the first non-colinear segment on the base substrate partially overlaps with an orthographic projection of the active layer of the driving transistor on the base substrate.

16. The array substrate of claim 14, wherein, in a (2k)-th column, a second non-colinear segment of the respective third reset signal line crosses over the first part of the third node portion in the (2k)-th column; and an orthographic projection of the second non-colinear segment on the base substrate is non-overlapping with an orthographic projection of a channel part of the active layer of the driving transistor on the base substrate.

17. An array substrate, comprising:

K number of reset signal lines respectively configured to provide reset signals to reset transistors in K columns pixel driving circuits of the array substrate;

wherein the K number of reset signal lines comprises:

a plurality of third reset signal lines in (2k−1)-th columns of K columns, K and k being positive integers, 1≤k≤(K/2); and a plurality of fourth reset signal lines in (2k)-th columns of the K columns;

wherein the array substrate comprises a plurality of gate lines;

wherein, in a respective pixel driving circuit, a respective gate line comprises a main portion extending along an extension direction of the respective gate line, and a gate protrusion protruding away from the main portion; and at least 70% of an orthographic projection of the gate protrusion on a base substrate is non-overlapping with an orthographic projection of a reset signal line on the base substrate.

* * * * *